(12) United States Patent
Roy

(10) Patent No.: US 9,200,522 B2
(45) Date of Patent: Dec. 1, 2015

(54) ACTIVE FILM COOLING FOR TURBINE BLADES

(75) Inventor: Subrata Roy, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 801 days.

(21) Appl. No.: 12/747,112

(22) PCT Filed: Dec. 15, 2008

(86) PCT No.: PCT/US2008/086860
§ 371 (c)(1),
(2), (4) Date: Aug. 20, 2010

(87) PCT Pub. No.: WO2009/079470
PCT Pub. Date: Jun. 25, 2009

(65) Prior Publication Data
US 2010/0310381 A1 Dec. 9, 2010

Related U.S. Application Data

(60) Provisional application No. 61/013,904, filed on Dec. 14, 2007.

(51) Int. Cl.
*F01D 5/18* (2006.01)

(52) U.S. Cl.
CPC .......... *F01D 5/186* (2013.01); *F05D 2260/202* (2013.01); *F05D 2270/172* (2013.01); *Y02T 50/673* (2013.01); *Y02T 50/676* (2013.01)

(58) Field of Classification Search
USPC .... 415/115, 116, 914; 416/96 A, 96 R, 97 R; 244/205
See application file for complete search history.

(56) References Cited

U.S. PATENT DOCUMENTS 5,419,681 A * 5/1995 Lee ............................ 416/97 R
5,465,572 A   11/1995 Nicoll et al.
(Continued)

FOREIGN PATENT DOCUMENTS

CN   1872620 A      12/2006
DE   103 61 882 A1   7/2005
(Continued)

OTHER PUBLICATIONS

Bogard, D.G., et al., "Gas Turbine Film Cooling," *Journal of Propulsion and Power*, Mar.-Apr. 2006, pp. 249-270, vol. 22, No. 2.
(Continued)

*Primary Examiner* — Dwayne J White
*Assistant Examiner* — Justin Seabe
(74) *Attorney, Agent, or Firm* — Saliwanchik, Lloyd & Eisenschenk

(57) ABSTRACT

A cooling system includes a surface comprising a plurality of orifices and a flow control plasma actuator positioned proximate an orifice to induce cooling air attachment to the surface. In an exemplary embodiment, the plasma actuator includes a power source, a first electrode in contact with a first dielectric layer and connected to the power source, a second electrode in contact with a second dielectric layer and connected to the power source, and a ground electrode. The power source drives the first electrode with a first ac voltage pattern and drives the second electrode with a second ac voltage pattern. The first voltage pattern and the second voltage pattern have a phase difference. In further embodiments, a dc voltage can be used to drive one or more of the electrodes, where the dc voltage can be pulsed in specific embodiments. In another embodiment, a cooling system includes a suction mechanism positioned proximate an orifice to induce cooling air attachment to the surface, the section mechanism being positioned downstream of the orifice.

38 Claims, 44 Drawing Sheets

(56) References Cited

U.S. PATENT DOCUMENTS

| | | | |
|---|---|---|---|
| 5,653,110 A | 8/1997 | Lee et al. | |
| 6,234,755 B1* | 5/2001 | Bunker et al. | 416/97 R |
| 6,570,333 B1* | 5/2003 | Miller et al. | 315/111.21 |
| 6,743,350 B2 | 6/2004 | Lee et al. | |
| 6,817,833 B2* | 11/2004 | Haselbach | 416/97 R |
| 6,981,846 B2* | 1/2006 | Liang | 416/97 R |
| 7,204,019 B2 | 4/2007 | Ducotey, Jr. et al. | |
| 7,374,401 B2* | 5/2008 | Lee | 416/97 R |
| 7,588,413 B2* | 9/2009 | Lee et al. | 415/115 |
| 7,695,241 B2* | 4/2010 | Lee et al. | 415/1 |
| 7,985,050 B1* | 7/2011 | Liang | 416/97 R |
| 7,988,101 B2* | 8/2011 | Osborne et al. | 244/205 |
| 7,999,173 B1* | 8/2011 | Ashpis | 136/251 |
| 2004/0265488 A1 | 12/2004 | Hardwicke et al. | |
| 2005/0169762 A1 | 8/2005 | Blume | |
| 2006/0163211 A1 | 7/2006 | Pietraszkiewicz et al. | |
| 2007/0163499 A1 | 7/2007 | Finn et al. | |
| 2008/0067283 A1* | 3/2008 | Thomas | 244/1 N |

FOREIGN PATENT DOCUMENTS

| | | |
|---|---|---|
| EP | 1790833 A2 | 5/2007 |
| EP | 1930545 A2 | 6/2008 |
| EP | 1930546 A2 | 6/2008 |
| JP | 5-248204 A | 9/1993 |
| JP | 2005-220824 A | 8/2005 |
| WO | WO-2007-063128 A1 | 6/2007 |

OTHER PUBLICATIONS

Chen, X., et al., "Industrial Sensor TBCs: Studies on Temperature Detection and Durability," *International Journal of Applied Ceramic Technology*, 2005, pp. 414-421, vol. 2, No. 5.

Garg, V.K., et al., "Heat Transfer on a Film-Cooled Blade—Effect of Hole Physics," *International Journal of Heat and Fluid Flow*, 1999, pp. 10-25, vol. 20, No. 1.

Han, J.C., "Turbine Blade Cooling Studies at Texas A&M University: 1980-2004," *Journal of Thermophysics and Heat Transfer*, Apr.-Jun. 2006, pp. 161-187, vol. 20, No. 2.

Haven, B.A., et al., "Kidney and Anti-Kidney Vortices in Crossflow Jets," *Journal of Fluid Mechanics*, Dec. 1997, pp. 27-64, vol. 352.

Heidmann, J.D., et al., "Coarse Grid Modeling of Turbine Film Cooling Flows Using Volumetric Source Terms," ASME 2001 Turbo Expo, Jun. 2001, New Orleans, LA, Paper No. 2001-GT-138.

Kapadia, S., et al., "First Hybrid Turbulence Modeling for Turbine Blade Cooling," *Journal of Thermophysics and Heat Transfer*, 2004, pp. 154-156, vol. 18, No. 4.

Lesieur, M., et al., "Large-Eddy Simulations of Shear Flows," *Journal of Engineering Mathematics*, 1997, pp. 195-215, vol. 32, Nos. 2-3.

Li, L., et al., "Combustion and Cooling Performance in an Aero-Engine Annular Combustor," *Applied Thermal Engineering*, Nov. 2006, pp. 1771-1779, vol. 26, No. 16.

Roy, S., et al., "Dielectric Barrier Plasma Dynamics for Active Control of Separated Flows," *Applied Physics Letters*, Mar. 2006, Article No. 121501, vol. 88, No. 12.

Singh, K.P., et al., "Study of Control Parameters for Separation Mitigation Using an Asymmetric Single Dielectric Barrier Plasma Actuator," *Plasma Sources Science and Technology*, Jun. 2006, pp. 735-743, vol. 15, No. 4.

Singh, K.P., et al., "Vortical Flow Control on a Conical Fore Body Cross Section Using an Array of Pulsed DC Actuators," *Journal of Applied Physics*, 2007, Article No. 093301, vol. 101, No. 9.

Xu, Z., et al., "Study on Flow Field of Turbine Blade with Flexible 3-Electrode Feeding Method in ECM," IET International Technology and Innovation Conference, 2006, *IET Conference Publications*, pp. 135-139, No. 524.

\* cited by examiner

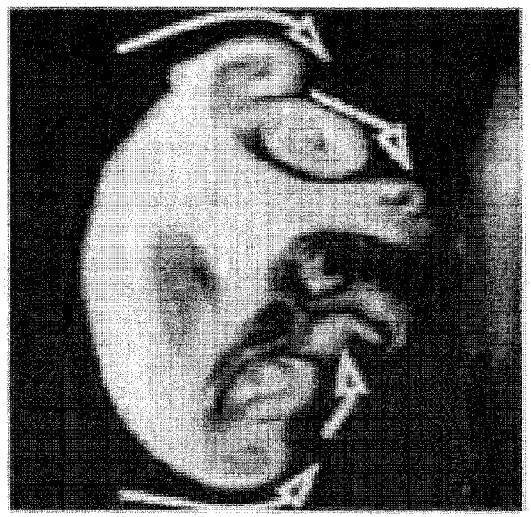
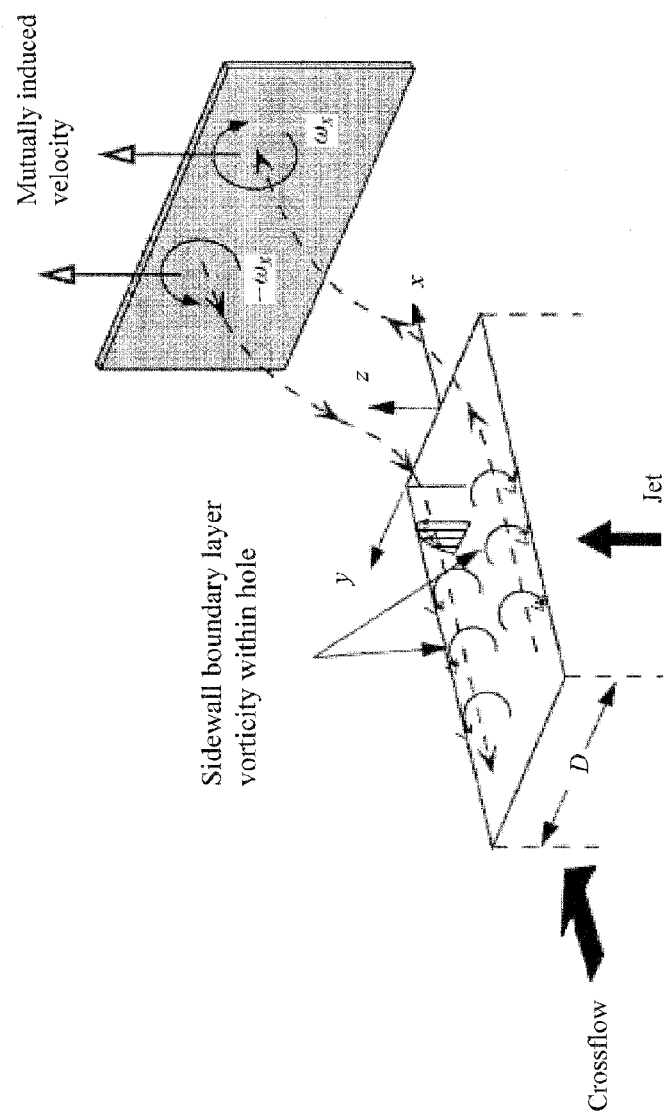
FIG. 2D (prior art)

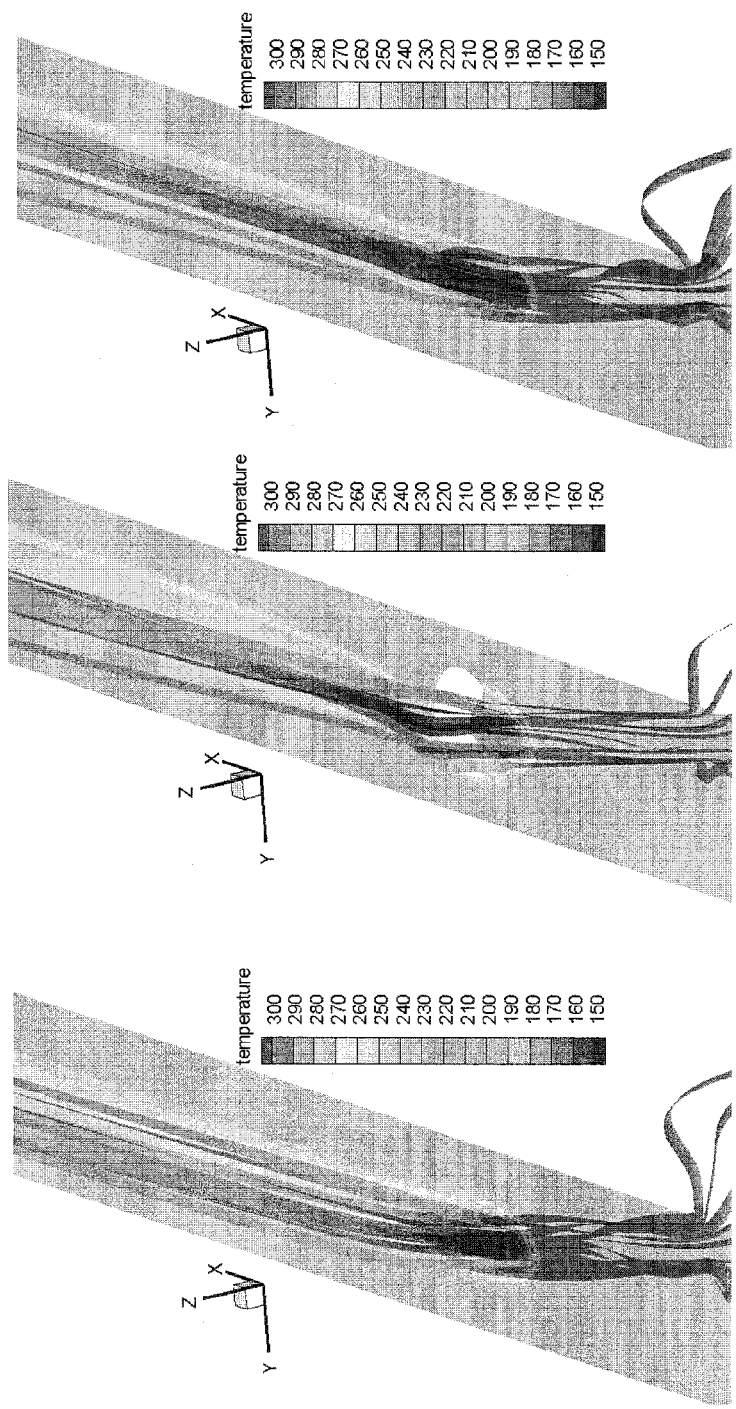

ACTIVE FILM COOLING FOR TURBINE BLADES

CROSS-REFERENCE TO RELATED APPLICATIONS

This application is the U.S. national stage application of International Patent Application No. PCT/US2008/086860, filed Dec. 15, 2008, which claims the benefit of U.S. Provisional Application Ser. No. 61/013,904, filed Dec. 14, 2007, the disclosures of which are hereby incorporated by reference in their entireties, including any figures, tables, or drawings.

BACKGROUND OF THE INVENTION

Cooling of hot surfaces with cold fluid film is commonplace in many engineering problems including vertical take-off and landing (V/STOL) and gas turbine blades. For example, gas turbines require proper cooling mechanism to protect its blades from thermal stresses due to hot combustion gases. The problem becomes aggravated by the need for higher turbine inlet temperature to generate more power. Film cooling is used as a mechanism for reducing such thermal stress and for increasing lifetime for a turbine blade. It commonly works in the form of a row of holes located in the spanwise direction, through which cold jets are issued into the hot crossflow. The penetration of cold jet into the main flow creates a three-dimensional flow field. Thus, the trajectory and physical path of thermal jet and the mixing mechanism of jet in the crossflow are critical design parameters.

FIG. 1A shows a general schematic of the tip of a turbine blade with film cooling holes and coolant plenum. A simplified form of this curved surface may be considered as a flat plate with a single round jet injected in the crossflow at an angle $\alpha$. This geometry has been extensively investigated for cooling performance for a wide range of blowing ratio (i.e., momentum ratio of injected air to crossflow). FIG. 1B shows a schematic control volume of hot air passing over a flat surface (e.g., a turbine blade). This surface of study has a row of injection holes through which the cool air is issued at an angle $\alpha=35°$. The cool jet at temperature $T_j=150K$ is injected into the hot freestream of $T_{fs}=300K$. The injection ducts are circular pipes with diameter equal to d=2.54 mm. The injection hole fonned by the intersection of the injection pipe with the wind tunnel is an ellipse with the minor and the major axes d and D=d/(sin $\alpha$), respectively. The distance between the hole centers is L=3d. The selected mean flow velocities, static pressures and temperatures (i.e., densities) in the injection pipe and the wind tunnel gives a blowing ratio M=1. The inlet section is located at x=−20d and the exit at x=29d. The other dimensions and boundary conditions are shown in FIG. 1B. The flat (blade) surface is considered adiabatic.

At the freestream inlet x=−20d, an injected mass flow rate inlet condition was applied with the density ratio of $\rho_j/\rho_f=2$, velocity ratio of $u_j/u_f=0.5$, and turbulent intensity of 5%. At the exit plane x=29d, the gauge pressure at the outlet boundary is maintained at 0 Pa. The work surface is an adiabatic wall with a single row of holes through which cool air at temperature is equal to $T_j=150K$ is injected at an angle of a=35° into the hot freestream of temperature $T_f=300K$. The domain extends from the plenum base at y=−6d to y=20d from work surface where a pressure-far-field boundary condition was applied. The periodic boundary condition was applied in the crosswise direction (at z=±1.5d) in the computational domain. Periodic boundary conditions were also employed in the spanwise direction, on all sides of the plenum.

Despite various innovative techniques, the film cooling effectiveness is ultimately limited by the loss of flow attachment just downstream of the hole. This is due to the "lift-off" of the cold jet beyond a threshold momentum ratio, as shown in FIGS. 2A-2C. The film cooling configuration which is designed for peak flow performance may not actively regulate itself for off-design conditions.

In modern turbomachinery applications (e.g., next generation aircrafts), the hot gas path temperatures inside the turbine are significantly impacted by efforts to reduce noise, fuel burn and emissions. This necessitates significant advancements in blade cooling technologies. It is known that cool jets parallel to the blade surface are the best possible design for film cooling. However, this has generally been infeasible from a manufacturing standpoint and industry resorts to the next best option, namely the shaped holes.

In the near field of the film cooling jet, the dynamic large scale structures control the mixing process. This three-dimensional mixing shown in FIGS. 2A-2C, from detached eddy simulation (DES) of film cooling, determines the normal and transverse penetration of the jet. In FIG. 2A, counter rotating vortical structures at the jet exit plane are colored by the static temperature. In addition, in FIG. 2D, a schematic of a jet-crossflow interaction and a Laser-induced fluorescence (LIF) image description are given. Accurate actuation of such flow field will greatly influence the near wall heat transfer process and the film cooling effectiveness. The complex dynamic nature of the spanwise vortices makes it desirable to use an active mode of control that will interact with the flow field temporally and spatially in the near wall region.

Accordingly, there is a need in the art for a method and apparatus for more efficiently cooling turbine blade.

BRIEF SUMMARY

Embodiments of the invention relate to a method and apparatus for cooling a surface. Specific embodiments can incorporate a plurality of orifices and a flow control plasma actuator positioned proximate an orifice to induce cooling air attachment to the surface. In an exemplary embodiment, the plasma actuator includes a power source, a first electrode in contact with a first dielectric layer and connected to the power source, a second electrode in contact with a second dielectric layer and connected to the power source, and a ground electrode. The second dielectric layer can be the same material as the first dielectric layer or can be a different material. The power source drives the first electrode with a first ac voltage pattern and drives the second electrode with a second ac voltage pattern. The first voltage pattern and the second voltage pattern have a phase difference. In another embodiment, a cooling system includes a suction mechanism positioned proximate an orifice to induce cooling air attachment to the surface, the suction mechanism being positioned downstream of the orifice. Embodiments of the present invention utilize the surface region denoted as the "Control Patch" in FIG. 1C for actively controlling the coolant flow and its three-dimensional spread over the work surface.

BRIEF DESCRIPTION OF THE FIGURES

FIG. 2D shows a flow interaction schematic (left) and Laser-induced fluorescence (LIF) image (right) from a prior system (Haven and Kurosaka, *J. Fluid Mech.* 352, pp. 27-64 (1997)).

FIGS. 19A-19C show the effect of plasma actuation on trajectories of cold jet particles; FIG. 19A shows a trajectory where the cooling hole exit is the baseline A with $F_{max}$=0; FIG. 19B shows a trajectory where the cooling hole exit has shape B with $F_{max}$=2000 kN/m$^3$; and FIG. 19C shows a trajectory where the cooling hole exit has shape D with $F_{max}$=2000 kN/m$^3$.

FIG. 33A shows centerline effectiveness $\eta_c$ and FIG. 33B shows spanwise averaged effectiveness $\eta_s$.

The figures may not be drawn to scale. Moreover, where directional terms (such as above, over, left, right, under, below, etc.) are used with respect to the illustrations or in the discussion, they are used for ease of comprehension only and not as limitations. The elements of the devices may be oriented otherwise, as readily appreciated by those skilled in the art.

DETAILED DISCLOSURE

Figure 1A:
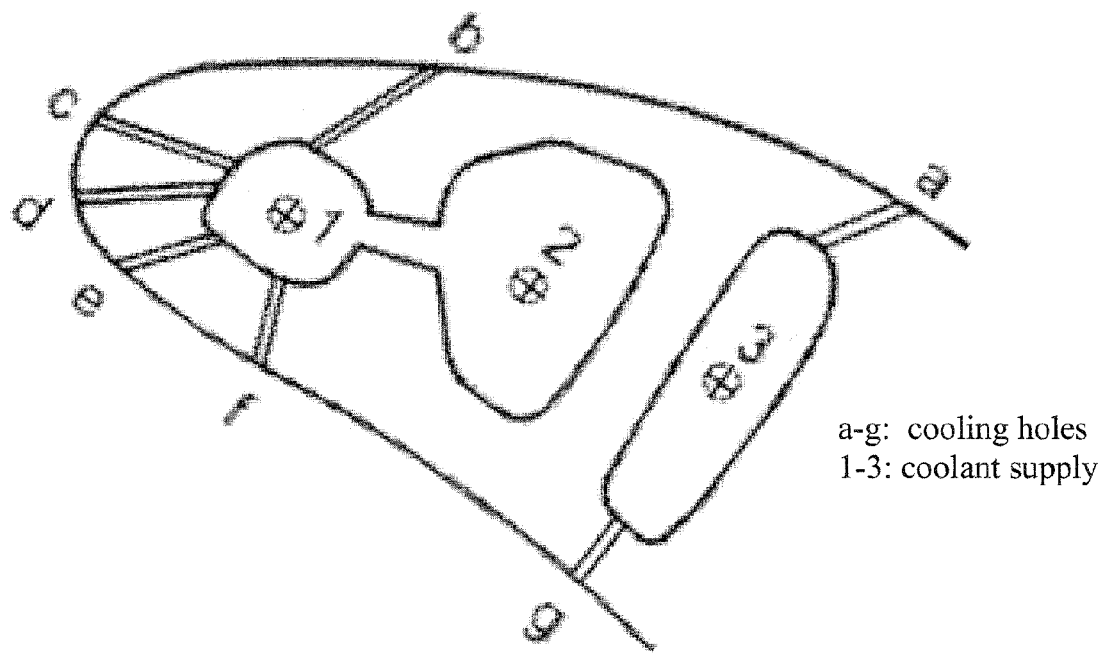
FIG. 1A shows a schematic of the tip of a turbine blade with cooling holes and coolant plenum.
Figure 1B:
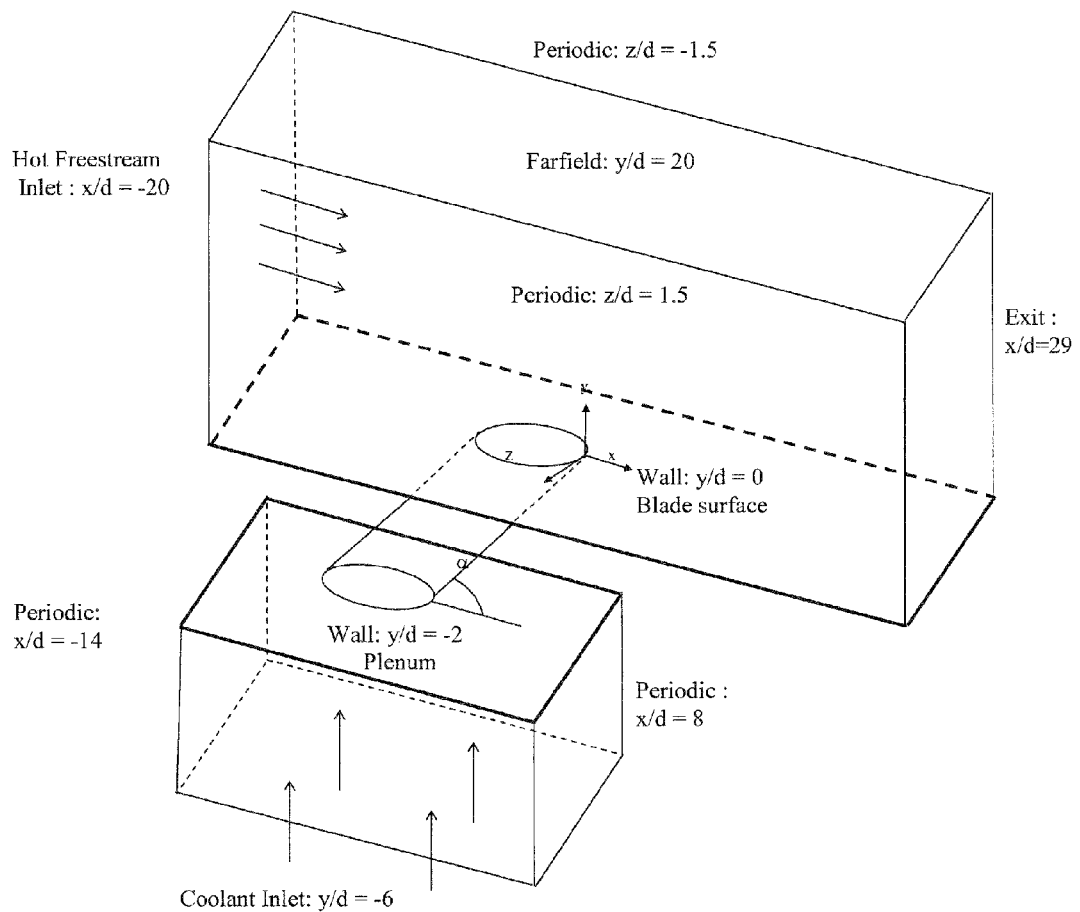
FIG. 1B shows a schematic of a single round jet injected in the cross flow at an angle $\alpha$.
Figure 1C:
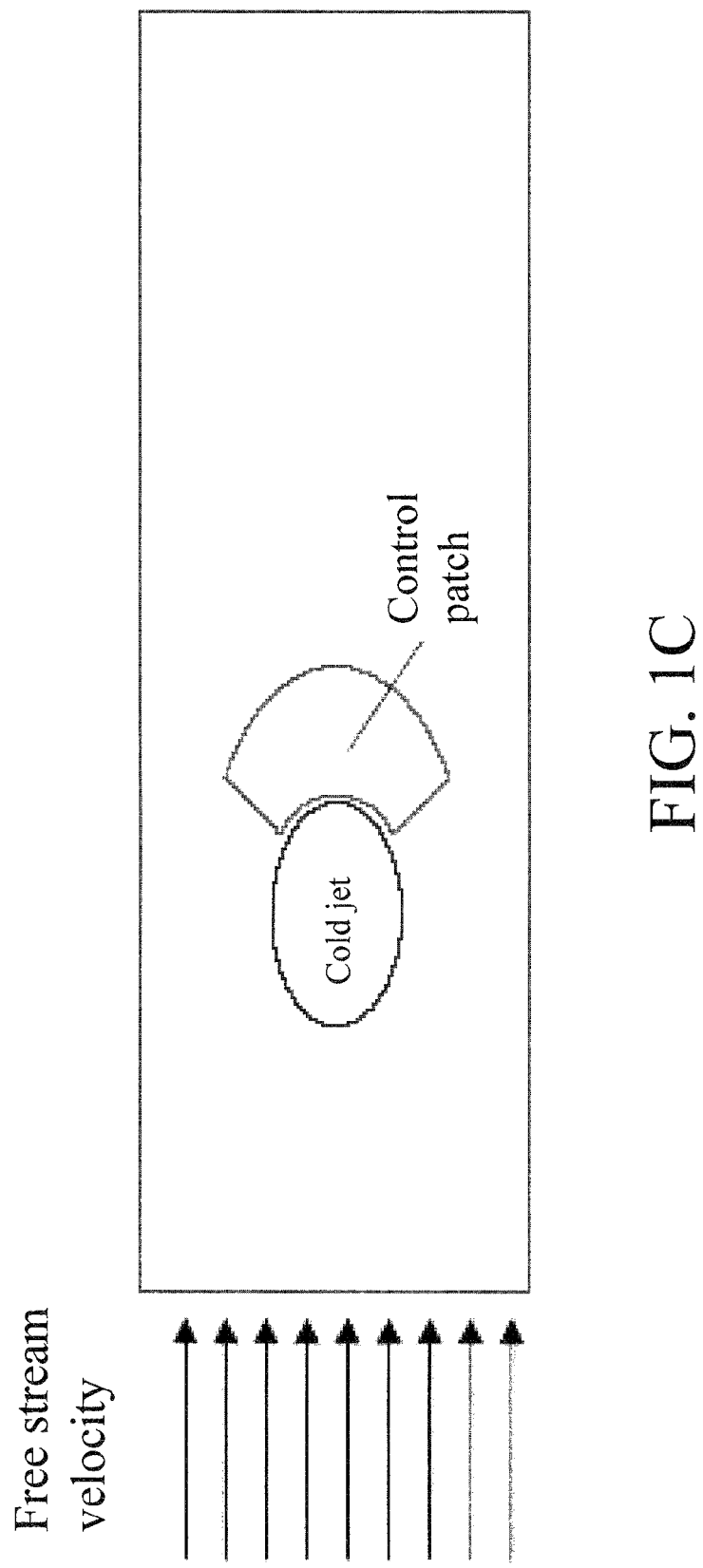
FIG. 1C shows a schematic of the film cooling flow boundary conditions on an adiabatic flat plate.
Figure 2A:
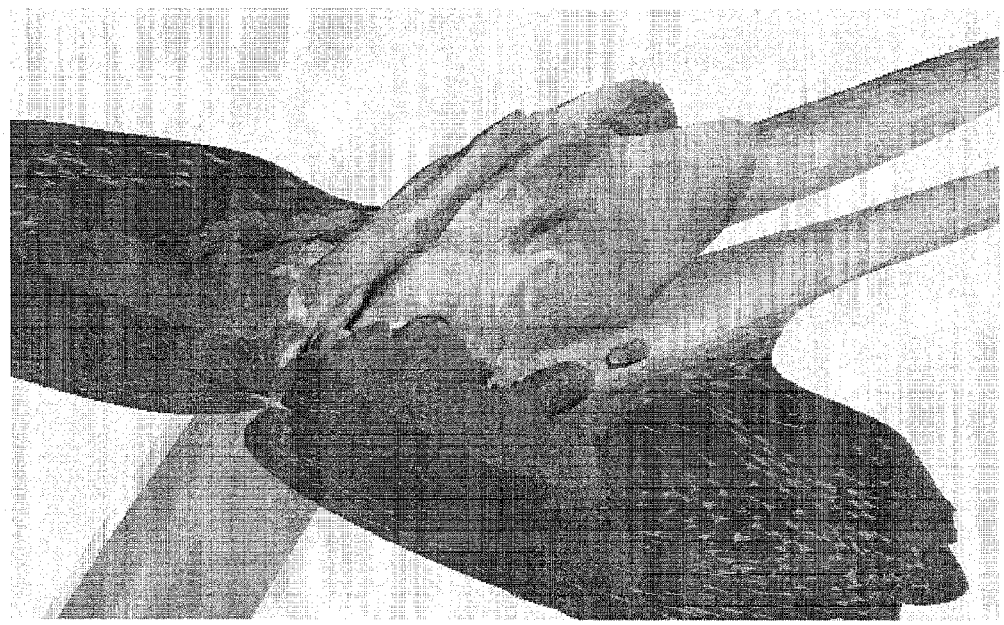
FIG. 2A shows vortical structures due to jet cross-flow interactions in a prior system.
Figure 2B:
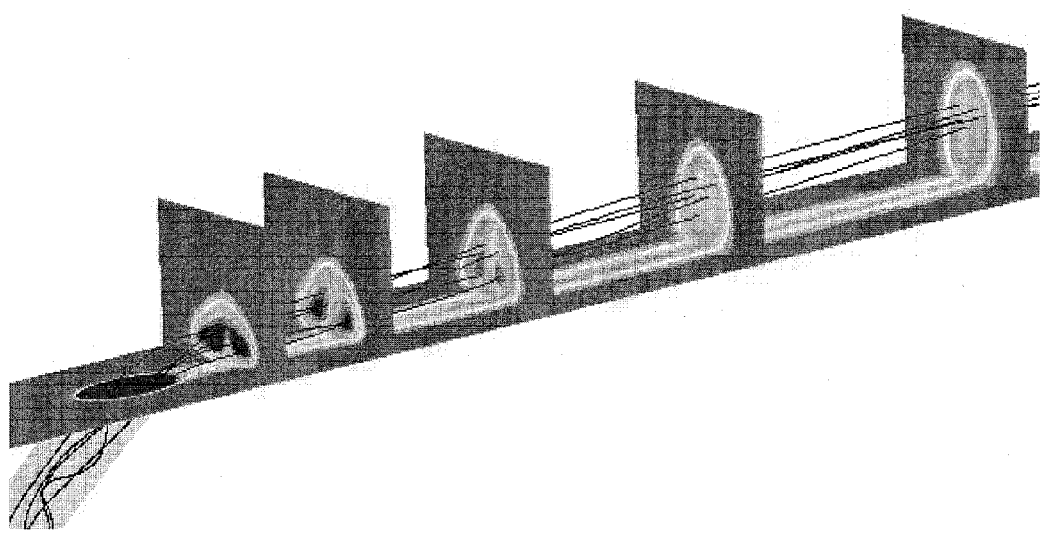
FIG. 2B shows diffusion of the cold jet into the hot cross-flow in a prior system.
Figure 2C:
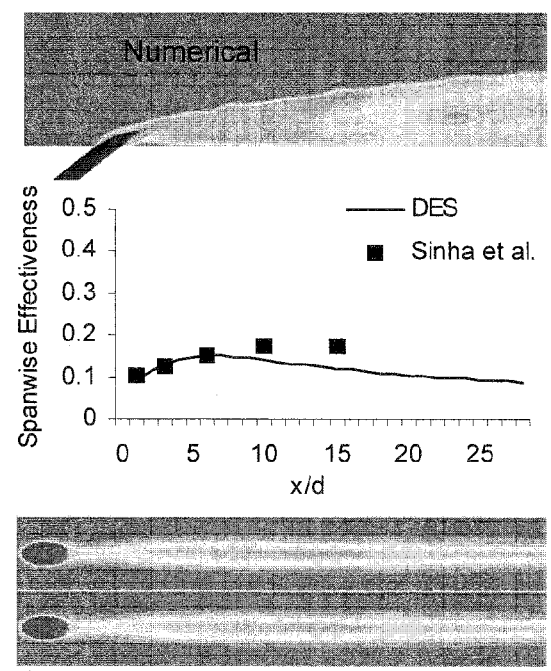
FIG. 2C is a large scale numerical simulation showing ineffective film cooling (blade surface temperature) in a prior system.

Embodiments of the invention can provide film cooling flow for the three-dimensional geometry. An example of a three dimensional geometry to which embodiments of the invention can be applied is shown in FIGS. 1A-1C. Embodiments can actively enhance interaction of cool air jets with hot crossflow for improved cooling of hot surfaces. Specific embodiments can improve cooling of low and high pressure turbine blades using plasma actuators for active flow control. Traditional methodologies for film cooled blades suffer from jet lift-off soon after the cool air is injected into the hot crossflow, which reduces the film cooling effectiveness.

One embodiment of the subject invention relates to an active thermal management system in which turbine blades have plasma actuators arranged between rows of film cooling holes to increase cooling effectiveness by inducing cold flow attachment to the turbine blade surface, thereby decreasing lift-off and related cooling loss. The design allows the cool jet to stay attached longer to the blade surface, significantly increasing the cooling effectiveness. Specific embodiments can include a plasma actuator arrangement between rows of film cooling holes. Application of this technology significantly impacts turbine blade life and related economy in many applications, such as high speed aerospace and power generation industries.

Figure 3A:
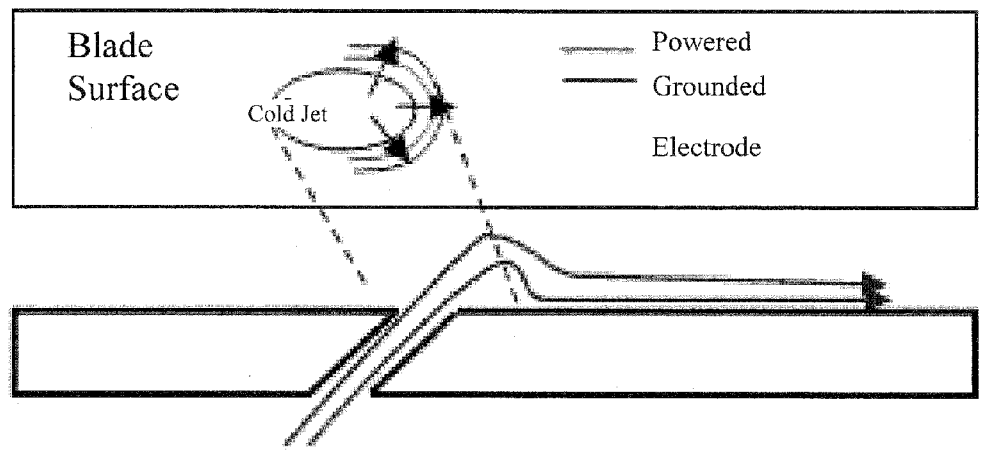
FIGS. 3A and 3B show designs for two embodiments in accordance with the invention.
Figure 4:
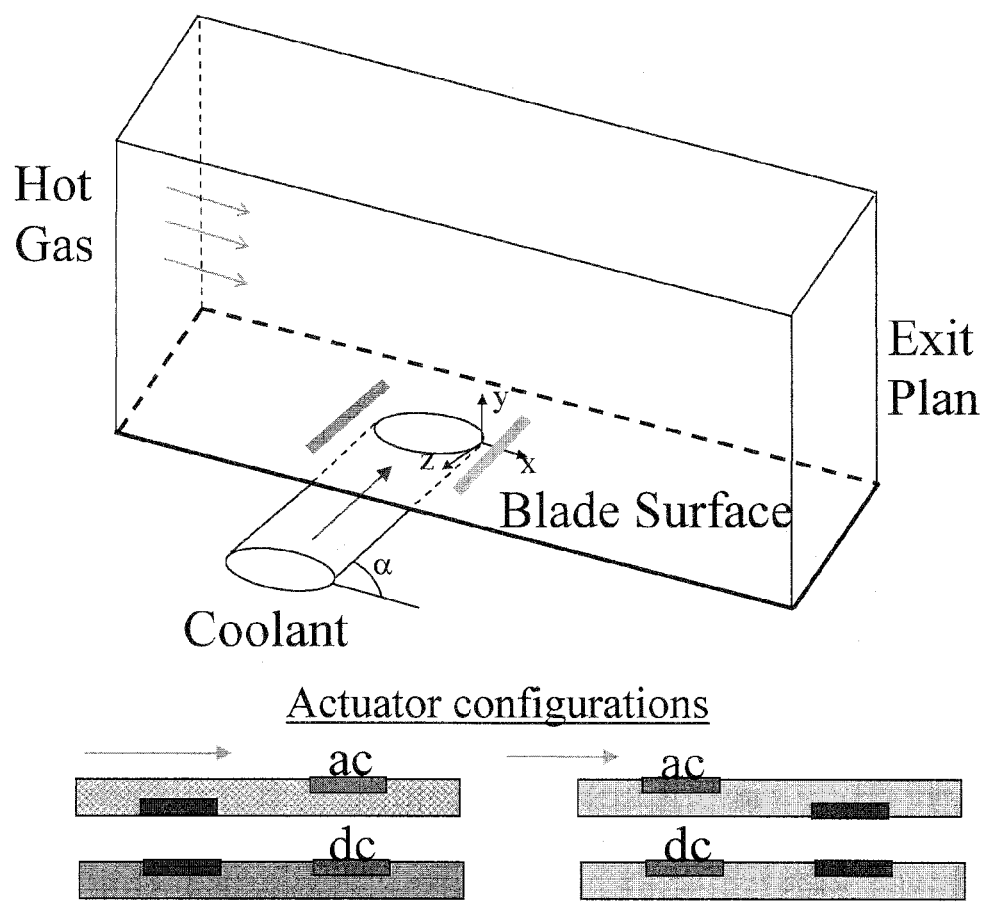
FIG. 4 is a schematic of a plasma actuator associated with a film hole in an exemplary embodiment of the present disclosure.

FIGS. 3A and 4 show a system that uses plasma actuators to induce cold flow attachment to the turbine blade surface. Distinct advantages associated with plasma actuators compared to other flow control actuators include: the absence of complicated mechanical or pneumatic systems and their moving parts; the absence of mass injection and thus mechanical inertia; potential for near-instantaneous deployment and operation over a broad range of frequencies; relatively low power consumption; rapid switch on/off capabilities, and the potential of electromagnetic forces to apply large forces in a relatively precise manner. Additionally, plasma-based devices are capable of operating at atmospheric conditions without uncontrolled macroscopic breakdown.

Figure 3B:
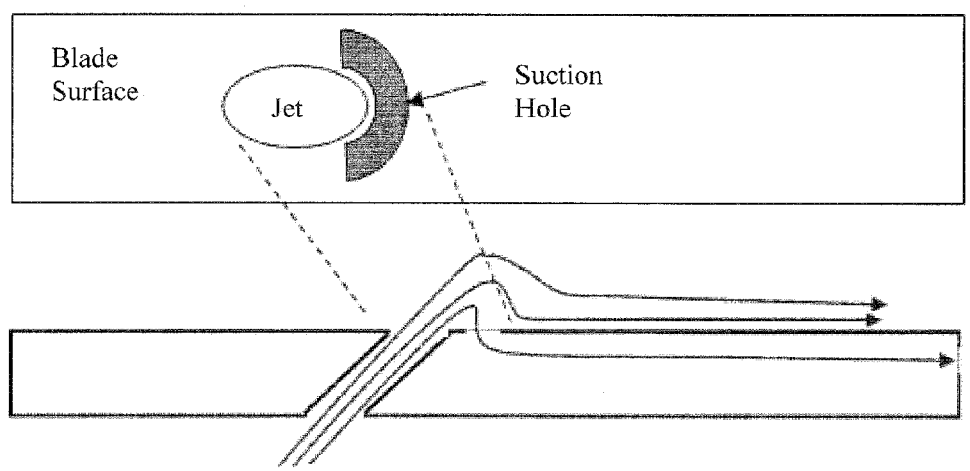

Two exemplary designs are shown in FIGS. 3A and 3B. FIG. 3A shows a plasma actuator that is positioned downstream of the cooling hole. In an alternative embodiment, the plasma actuator can be positioned upstream of the cooling hole or both upstream and downstream of the cooling hole. Such actuators are made of a set of electrode pairs between which electric potential and induced weak ionization of the working gas generate an electric body force that is dominant inside the boundary layer. In such an actuator the flow actuation is directly linked with the gas-charged particle interaction and is thus instantaneous. A small fraction of power (less than 1% of the turbine power) will be utilized for such arrangement, which may eventually reduce the energy budget by more effective cooling.

In the embodiment shown in FIG. 3B, a suction pressure is used just downstream of the cooling jet hole. The trail end pressure drop is used to attach the cool jet to the surface. Based on the blowing ratio, the pressure drop varies across the blade chord. The dissimilarity in the shape of cool jet and suction holes can help their dimensional mixing. If hot gas entrainment is a concern, suction holes of equal or smaller size than the cool jet may be used. An advantage of this design includes three-dimensional dispersion of the cold jet without any major loss in flow energy.

Exemplary embodiments are directed to the use of a multilayer or multibarrier plasma actuator design having several layers of a dielectric substrate, each layer enveloping an electrode. In one embodiment, the inter-electrode gap is kept at a few microns to decrease the power requirement. Various configurations include differences in, for example, the number of insulation layers, insulation thicknesses, dielectric strengths, number of electrodes, electrode widths, inter-electrode gap spacings, applied frequencies, duty cycles, and voltages. This allows a user to identify optimum operating parameters for blade film cooling performance for a particular application. Such improvements can extend the turbine blade lifetime significantly and reduce the cost of maintenance, by as much as an order of magnitude.

Referring to FIG. 4, two actuator configurations are shown. The first has two electrode pairs, one upstream and one downstream of the orifice. The electrodes of each pair are separated by a dielectric layer with an ac voltage applied to the top electrode and the bottom electrode is grounded. The second configuration has two pairs of electrodes, one pair upstream and one pair downstream of the orifice. A DC voltage is applied to one of the electrodes and the other electrode is at ground.

Figure 5:
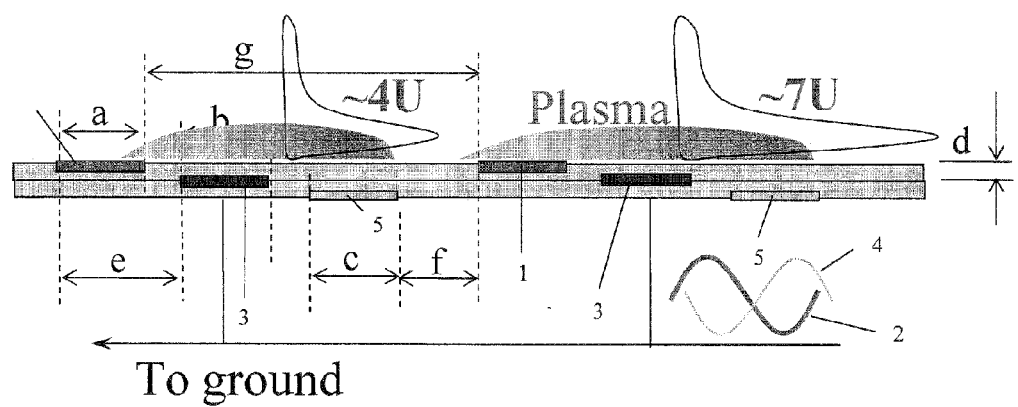
FIG. 5 is a schematic diagram of one embodiment of a multilayer actuator in accordance with the subject invention.

In an exemplary embodiment, a multilayer actuator includes several layers of dielectric, each incorporating an electrode. FIG. 5 shows a schematic for one embodiment of a bi-layer design. The interelectrode distance d is kept at a few microns, thereby reducing or eliminating the kHz RF power requirement. In an experiment, the electrodes are powered with wall ac supply (60 Hz) through neon transformers and tested for a stable glow. The voltage pattern 2 shown at the bottom right of FIG. 5 is applied between the electrode 1 nearest the surface and the ground electrode 3 in the middle of the dielectric layers, while voltage pattern 4 is applied between the electrode 5 farthest from the surface and the ground electrode 3. The electrode 1 nearest the surface can be exposed to the fluid in the flow region or can have a coating separating the electrode 1 surface from the fluid in the flow region, depending on the fluid properties (e.g., electrical conductivity) and other design parameters.

Figure 6:
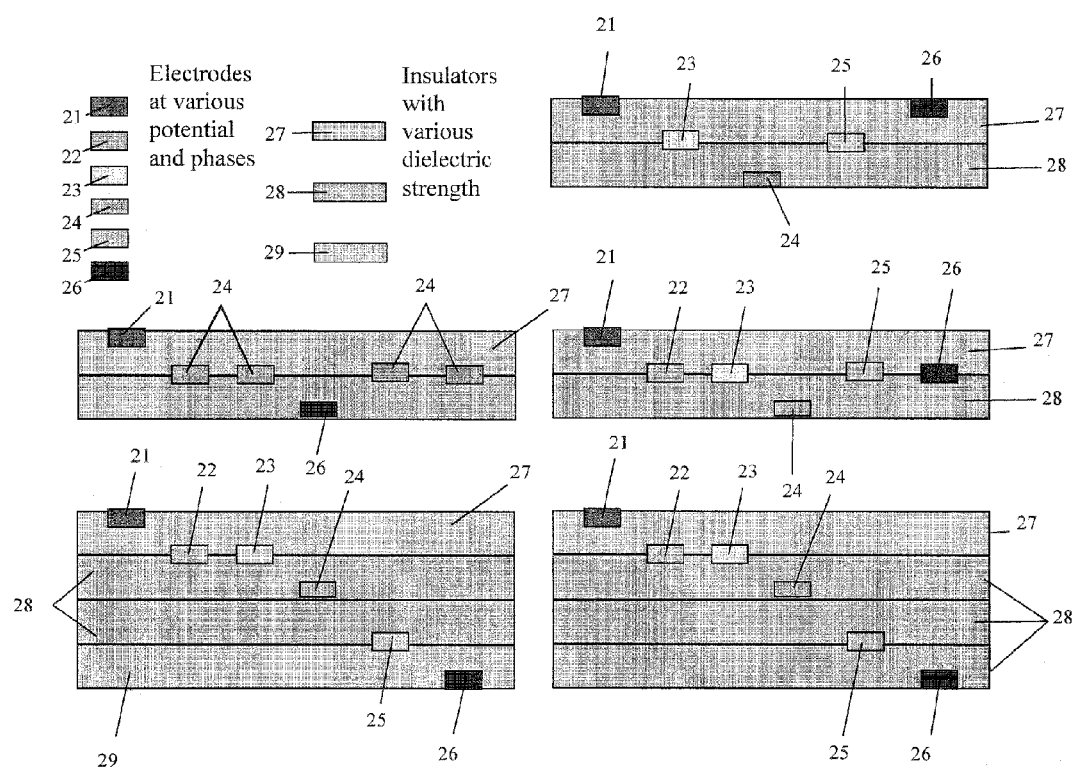
FIG. 6 illustrates several additional exemplary embodiments of multilayer actuators used in accordance with the subject application.

FIG. 6 illustrates several additional exemplary embodiments of the multilayer actuators in accordance with the subject disclosure, showing various geometric and electrical configurations. Various insulator materials such as KAPTON™ and TEFLON™ and their combinations, for example, can be utilized for minimum heat loss inside the dielectric material.

Mechanisms "push" or "pull" the essentially-stagnant fluid just downstream of the hole by enforcing an active pressure pulsation in streamwise and crosswise directions. A first method utilizes electrodynamic force that induces cold jet attachment to the work surface by actively altering the body force field in the vicinity using a plasma actuator. A second method employs a negative pressure region just downstream of the cooling hole. This may be generated by utilizing a suction vent or other mechanism. Pressure pulsations are generated in a fashion to induce lateral mixing of the cold jets and to ensure better attachment of jet to the surface. Numerical predictions with finite volume based simulation are performed using standard turbulence models. Detailed computation of a single row of 35 degree round holes on a flat plate has been obtained for a select blowing ratio of 1.0 with a density ratio of 2.0. Results are compared with the published experimental results and other numerical predictions for the latest film cooling technology to identify effectiveness improvement. An improvement of 150% over the standard baseline design can be achieved.

An important parameter for comparing film cooling performance is its effectiveness $\eta=(T_s-T_j)/(T_h-T_j)$, where $T_s$, $T_j$ and $T_h$ are the work surface, cooling jet and hot freestream gas temperatures, respectively. The effectiveness is plotted against a non-dimensional ratio x/Md, where x is the downstream distance, $M=\rho_j u_j/\rho_f u_f$ is the blowing ratio, and d is the slot (hole) width. The density $\rho_j$ and velocity of the fluid at the jet exit plane are related to the freestream density $\rho_f$ and velocity $u_f$ such that $M\rho_j/\rho_f=u_j/u_f$. As compared to the slots, a row of discrete holes typically has a much lower span averaged downstream film effectiveness distribution for the same x/Md due to the formation of vortices that allow hot gas to penetrate to the wall. These vortices are of the scale of the hole size and smaller. In an exemplary embodiment, a computational mesh has a minimum node spacing much smaller than the film hole spanwise pitch. Otherwise, such calculation becomes two-dimensional on the scale of the film holes. Several experimental efforts have been documented in the literature. They measured the scaling effect of the hole spacing to diameter ratio and the influence of the inclination of the holes to the surface on a flat plate and on curved (turbine blade-like) surfaces at different flow thermal conditions.

Numerical solutions of the full Navier-Stokes equations have also been used to obtain detailed solutions in various studies. These efforts include closure models based on constant turbulent viscosity, variants of Reynolds averaged Navier-Stokes (RaNS), large eddy simulation (LES) and hybrid turbulence models (like DES). Numerical solutions for these flow arrangements document strong to moderate secondary vortex structures spanning normal to the direction of the jet. This fully three-dimensional flow field strongly influences the cooling performance of the hole-blade system. Computational results predict an optimum hole spacing and low issuing angle for maximum cooling efficiency.

Several computational studies have computed turbine blade geometries with accurate resolution of the film holes, and in some cases, of the hole pipes and plena as well. Garg and Rigby (V. K. Garg and D. L. Rigby, 1999, "Heat Transfer on a Film-Cooled Blade—Effect of Hole Physics," Int. J. Heat and Fluid Flow, 20, pp. 10-25) resolved the plenum and hole pipes for a three-row showerhead film cooling arrangement with Wilcox's k-ω turbulence model, and Heidmann et al. (J. D. Heidmann and S. D. Hunter, 2001, "Coarse Grid Modeling of Turbine Film Cooling flows using Volumetric Source Terms," ASME Paper 2001-GT-0138) used RaNS to compute the heat transfer for a realistic turbine vane with 12 rows of film cooling holes with shaped holes and plena resolved. Garg presented results of a full rotating blade with 172 film holes, resolving the cooling hole exits, but not the hole pipes and plena. These studies provide good details of the flow. However, the anisotropic dynamic nature of the spanwise vortices that affect the film cooling process are more complex than that can be captured by the mixing models used in aforementioned references. The two competing factors important for any turbulence model are accuracy and efficiency (i.e., computational cost). An optimal combination of both these factors is difficult to achieve and, thus, the primary purpose of the numerical simulation is towards attaining such a goal. Although LES requires less computational effort and can simulate flows at higher Reynolds number than direct numerical simulation (DNS), one major challenge for perfoiming LES in film cooling is the range of length scales that must be resolved in the computation, as shown by Lesieur et al. (Lesieur, M., Comte, P., Lamballais, E., Métais, O., and Silvestrini, G., 1997, "Large-eddy simulations of shear flows," *J. Eng. Math.*, 32, pp. 195-215).

As a remedy, Kapadia et al. (S. Kapadia, S. Roy and J. Heidmann, 2004, "First hybrid turbulence modeling for turbine blade cooling," *J. Thermophys. Heat Transfer*, 18 (1) 154-6) utilized a detached eddy simulation (DES) turbulence model on a widely published blade-pipe configuration for a unit blowing ratio. DES model makes no such assumption of isotropy downstream of the hole. Results indicate that the mixing processes downstream of the hole are highly anisotropic, as the turbulent diffusion is much stronger in the transverse direction. In comparison to the RaNS solution temperature distribution on the blade and near the vertical symmetry plane, DES captured better description of the dynamic flow structures.

The complex dynamic nature of the film cooling flow makes it desirable to actively control it with a dynamic force that varies temporally and spatially, working with the dominant turbulence scales. Both pulsed dc and ac powered plasma actuators can induce such active control over the dynamics of film cooling in accordance with embodiments of the invention.

Figure 7:
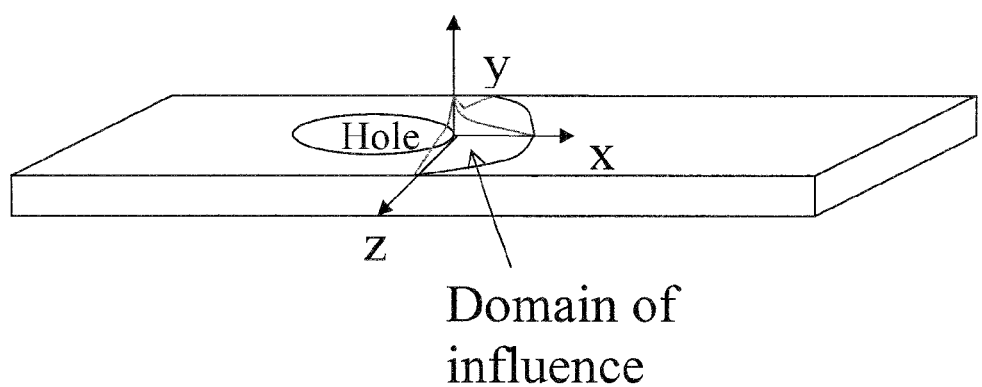
FIG. 7 is a schematic diagram of a force model used to approximate a plasma actuator.

The induced force in such actuators is typically local (within a few mm) and diminishes quickly outside the domain of influence as shown FIG. 7. Based on numerical analysis, the force may be approximated as an exponentially decaying distribution with its peak just downstream of the cooling hole exit. While in practical situations this force will be transient, the time average of the electric force as body force is considered in the simulation. This is allowable due to largely disparate timescales of plasma and gas flow.

Figure 8:
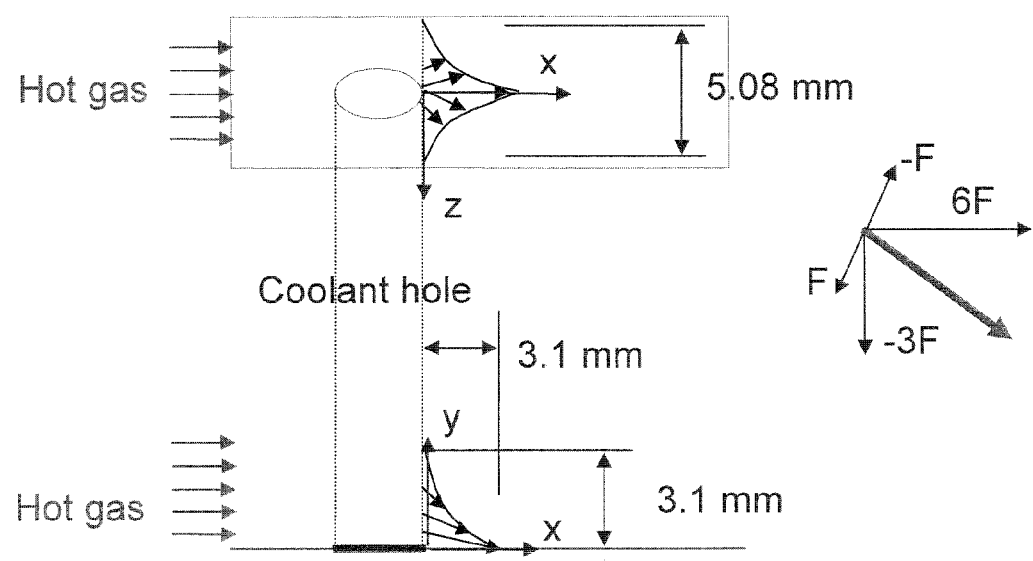
FIG. 8 shows directional distribution of the force.

Referring back to FIG. 1B, at the walls, an adiabatic wall boundary condition with no-slip was imposed for the simulation. All other boundaries except for the Control Patch (CP) are maintained at homogeneous Neumann condition. The CP, which is located just downstream of the coolant hole, can be used to actuate the flow. In an embodiment, the flow can be actuated in the following manner. The base case and the simulation for the design shown in FIG. 3A are done with CP as adiabatic wall. For the design shown in FIG. 3A, the time averaged force vector is shown in FIG. 8 and represented as $$\vec{F}=+6F\hat{i}-3F\hat{j}\pm F\hat{k} \text{ where } F=F_{max}*f_x*f_y*f_z \text{ with}$$

$$f_x=((x-d/2)^2+C_1)/C_2, f_z=((z-d/2)^2+C_3)/C_4,$$

$$f_y=(\exp(-1000y)/C_5)-C_6.$$

$F_{max}$ is varied from 0 to 10000kN/m³ with an increment of 2000 kN/m³. For the second set of simulations, $C_1$=1.5×10⁻⁶, $C_2$=3.09×10⁻⁶, $C_3$=0.98, $C_4$=0.057, $C_5$=1.58×10⁻⁶, $C_6$=3.14×10⁻⁶. For the design shown in FIG. 3B, the CP is maintained at negative pressure $P_{CP}$=0, −200 and −2000 Pa for three cases simulated to impose a suction condition. For the second set of simulations for embodiments incorporating a suction hole, the CP is maintained at negative pressure $\Delta P_{CP}=P_f-P_{cp}$=2823, 3376, and 4438 Pa for three cases simulated to impose a suction condition, where $P_f$ is freestream inlet pressure.

The established 3-D mathematical model can be solved by, for example, a commercial CFD package, FLUENT 6.3.26, which is based on the finite volume method. According to the experiments, it is assumed that the flow is incompressible and is a steady-state turbulent flow. The Reynolds number based on hole diameter and inlet conditions was 16100. A maximum Mach number not exceeding 0.3 was achieved in the flow field while maintaining the desired Reynolds number by scaling the experimental geometry down by a factor of 5. This resulted in a hole diameter of 2.54 mm, and was done to allow more rapid convergence of the solution using the density-based formulation of the computer code while minimizing compressibility effects.

Figure 9A:
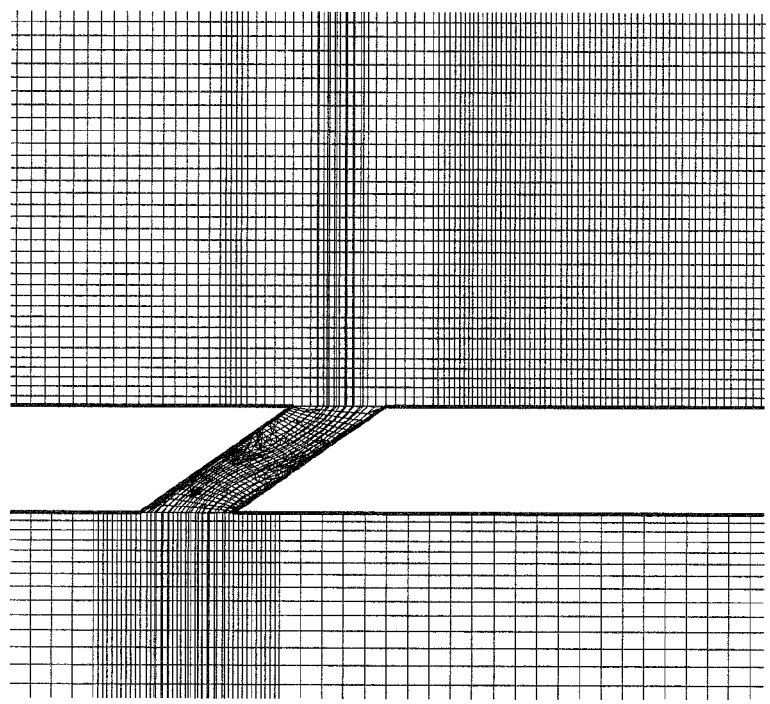
FIGS. 9A and 9B show computational mesh details for providing representative velocity vectors for the steady state solution of the cooling pipe.
Figure 9B:
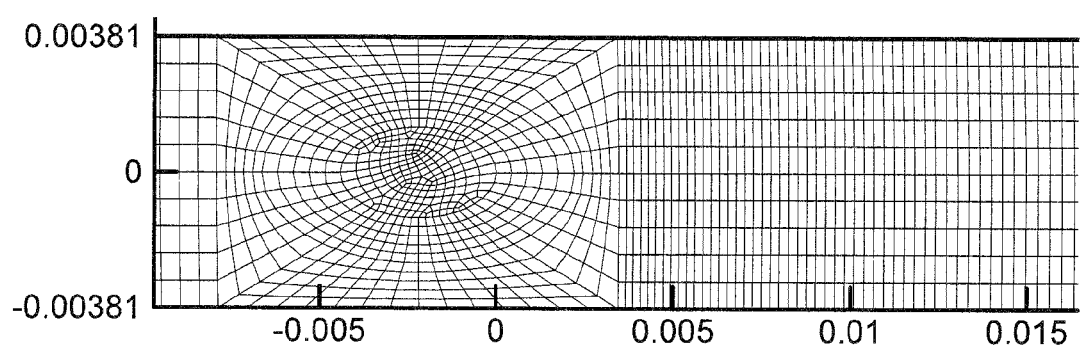

Ideal gas approximation and the AUSM solver closed with Renormalized Group (RNG) k-epsilon turbulence model with standard wall function were used. The courant number was set equal to 1 for solution control. A second-order upwind discretization method is used. Convergence is determined when the residual among the continuity, momentum, energy, turbulent kinetic energy, and turbulent dissipation are less than $10^{-3}$. FIGS. 9A and 9B show the density of computational grid near the coolant hole. The simulation for the design of in FIG. 3A was performed on a mesh consisting of 203665 cells with minimum $y^+ = 8.02$ while those for the FIG. 3B design were 436307 cells and minimum $y^+ = 3.46$. The base solutions are compared and considered mesh independent.

Figure 9C:
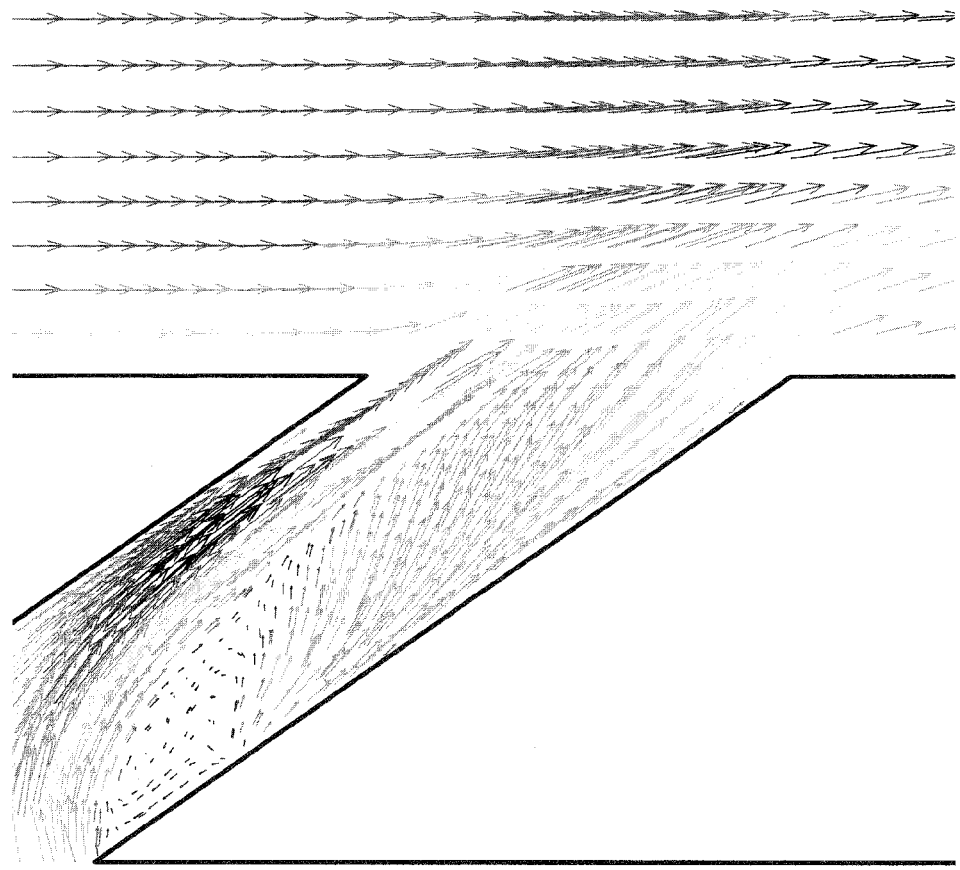
FIG. 9C shows a steady state solution of the cooling pipe with velocity vectors colored by fluid speed at the central (z=0) plane.

18 cases were simulated for the first set of simulations. Six of them relate to the FIG. 3A design while the other 12 are for the FIG. 3B design. 12 cases were simulated for the second set of simulations. One base case, five cases related to the design shown in FIG. 3A, three cases related to the design shown in FIG. 3B, and three additional simulated cases. An inherently time averaged turbulence model was used, and computed results are presented at steady state. In FIG. 9C, representative velocity vectors colored by speed inside the injection pipe describe a stratification of kinetic energy inside the tube. At steady state, the RNG solution shows that most of the fluid is impinging at a high velocity (about 120 m/s) on the left half of the tube. Near the bottom, the entrained fluid is creating a large recirculation stretching towards the middle of the pipe. As a result, at the exit plane of the tube, the flow is highly nonuniform. This is in agreement with the qualitative results reported in the literature. Clearly, for this moderate blow ratio M=1 and a combination of flow profiles at the wind tunnel and cold jet inlet, the effect of the vorticity in the pipe is not negligible. This is due to the fact that at this range of velocities existing in the pipe, the boundary layers are not thin everywhere in the pipe. Coarse grids cannot resolve the effect of the downstream vortices.

Figure 10:
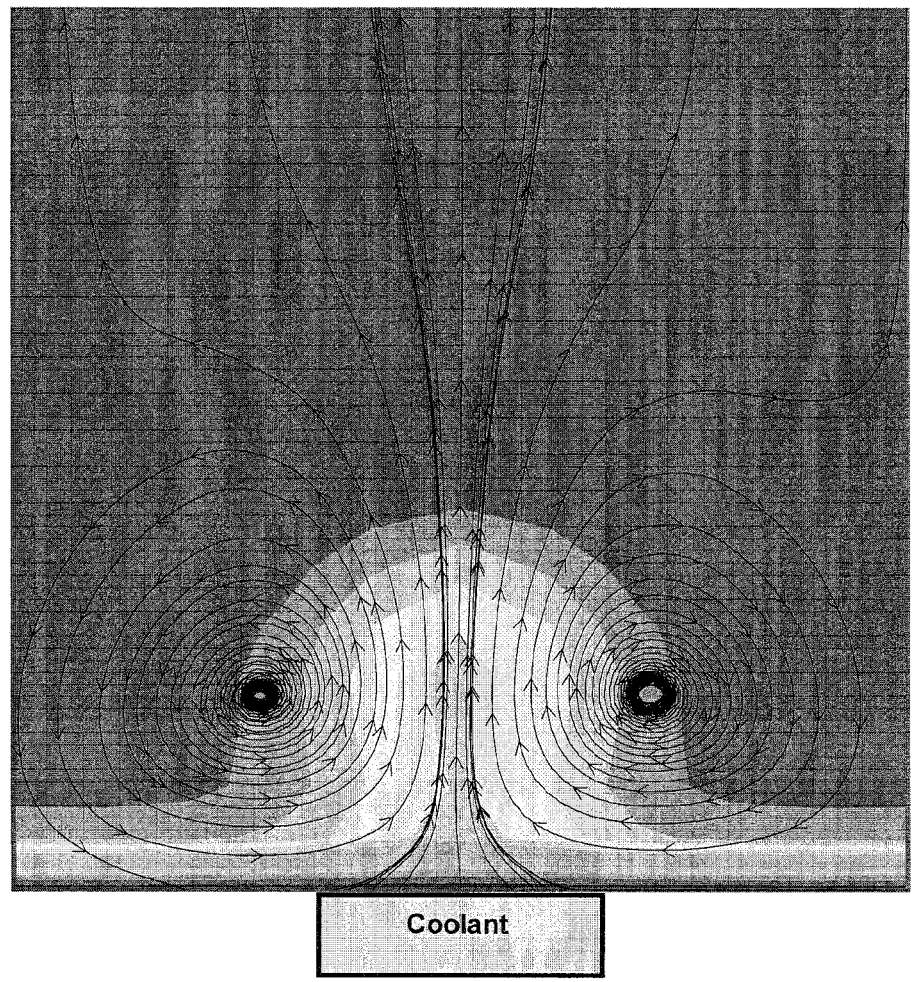
FIG. 10 shows velocity vectors at x/d=5 and shows kidney-shape flow structures.

Corresponding flow field velocity vector distribution in the spanwise direction is shown in FIG. 10 at x=5d. The effect of the wind tunnel vorticity is significant at this plane. This is more pronounced in the u- and v-velocity profiles. The assumption of uniform velocity profile in the wind tunnel leads to higher v-values in the near-wall jet flow region. In this case, the maximum in the u-velocities is located below the maximum in the case of developed inlet profile in the wind tunnel. The tendency is that as the boundary layer in the wind tunnel becomes thicker, the velocity maxima appear at higher distances from the wall and the near-wall flow changes dramatically. At very thick boundary layers, the flow close to the wall behaves as a typical boundary layer, while for very thin incoming boundary layers a wall-jet flow exists downstream the jet exit. Such flow motion creates a bound kidney shaped vortical structure that stretches downstream along the primary flow direction.

Figure 11:
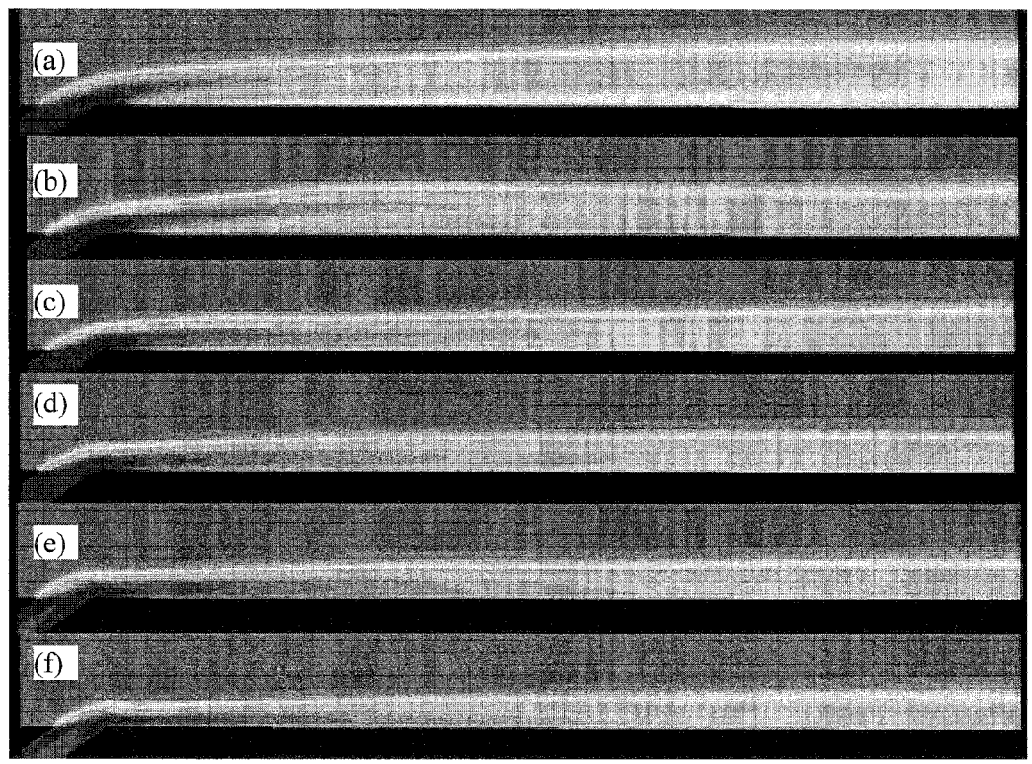
FIG. 11 shows a temperature profile (red=300K, blue=150K) along the vertical plane at z=0 plane for $F_{max}$=(a) 0, (b) 2000, (c) 4000, (d) 6000, (e) 8000, (f) 10000 kN/m$^3$.

FIGS. 11-14 illustrate the effect of the imposed (plasma actuator) body force on film cooling. FIG. 11 plots the temperature distribution on the vertical mid-plane (z=0). It can be seen from the temperature distribution how the lift-off causes significant reduction in cooling effectiveness. As the body force increases from an initial zero ($F_{max}=0$, no actuator) to a maximum of $F_{max}=10000$ $kN/m^3$ (effective force ~N), the flow attaches to work surface. Note that this can be done actively either by embedded sensing of the blowing ratio or, preferably, the mean effectiveness on the work surface.

Figure 12:
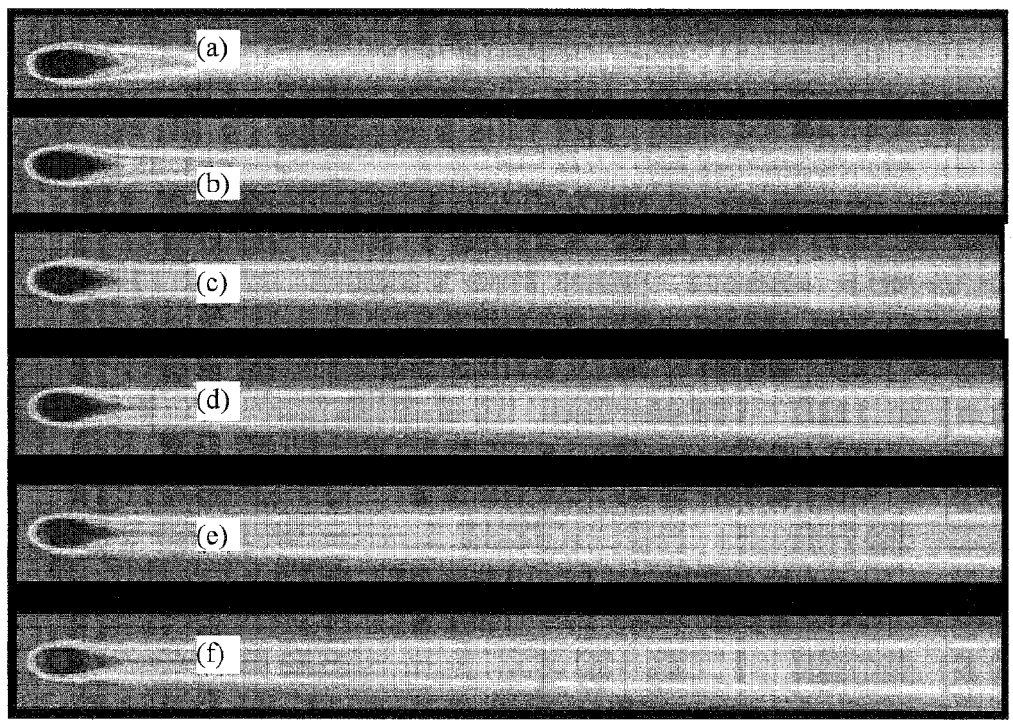
FIG. 12 shows a temperature contour on the work surface (y=0) and shows cooling flow attachment as actuation body force increases with $F_{max}$=(a) 0, (b) 2000, (c) 4000, (d) 6000, (e) 8000, (f) 10000 kN/m$^3$.
Figure 13:
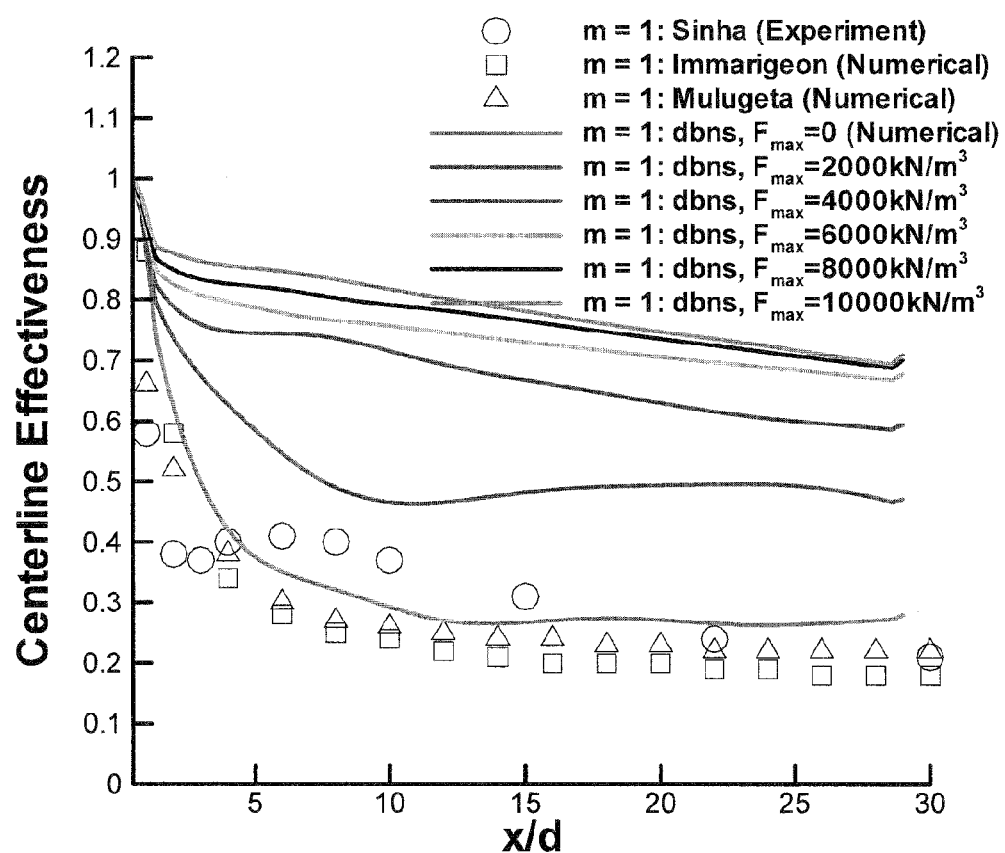
FIG. 13 shows the effect of actuator force downstream of a hole, showing significant increase in centerline film cooling effectiveness.
Figure 14:
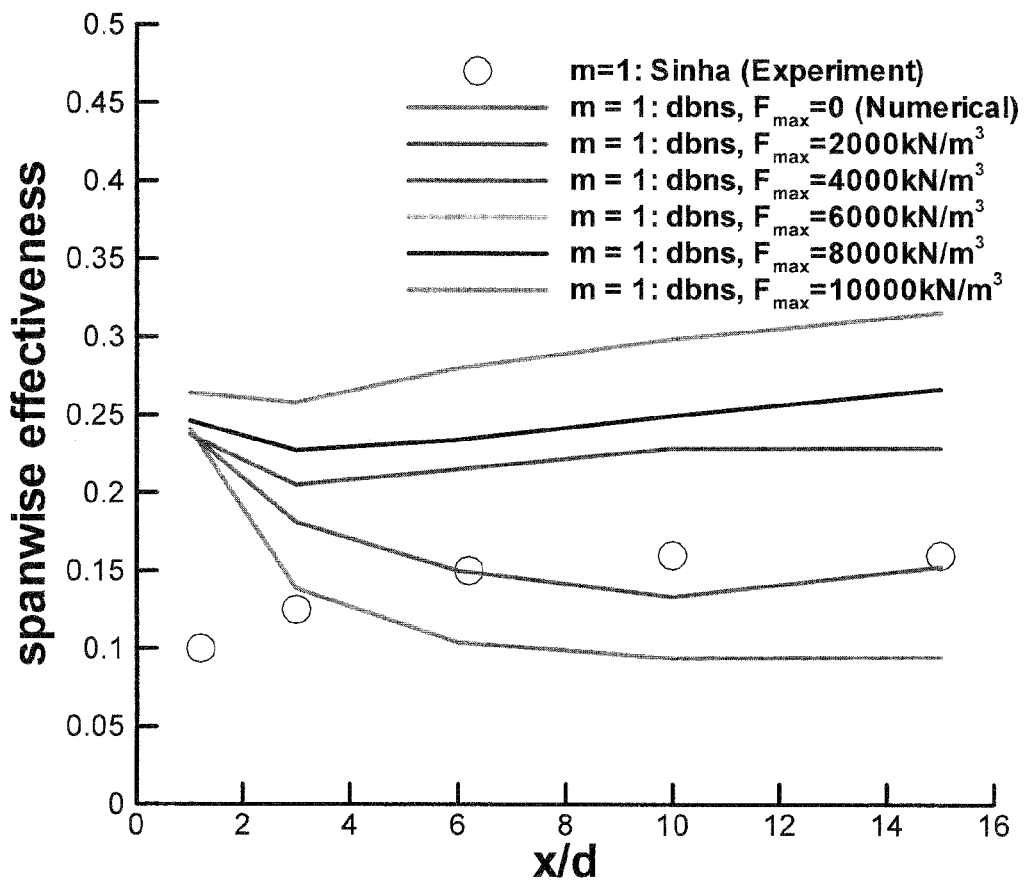
FIG. 14 shows the effect of actuator force downstream of a hole, showing significant increase in spanwise averaged film cooling effectiveness.

FIG. 12 shows the temperature distribution on the horizontal work surface (y=0). Importantly, the actuation force applied in a three-dimensional manner demonstrates successful spreading of the cold film over the flat (blade) surface not only in the streamwise direction but also in a crosswise fashion, in accordance with embodiments of the invention. Thus, the cooling performance reflects such improvement. FIG. 13 plots the centerline effectiveness while FIG. 14 shows the spanwise averaged effectiveness over the work surface. The computed centerline results for the baseline case (no control) compares reasonably with the previously reported experimental and numerical results. At x/d=5, the effect of plasma actuation is evident. The centerline effectiveness in FIG. 13 increases by over 150% as the force increases to the maximum. The spanwise averaged effectiveness in FIG. 14 also increases simultaneously, demonstrating the three dimensional flow control. Interestingly, this spanwise effectiveness continues to increase with distance from the cooling hole. For example, at x/d=1, the effective increases from 0.24 to 0.26 as $F_{max}$ varies from 0 to 10000 $kN/m^3$; at x/d=5, it increases from 0.11 to 0.28; at x/d=15, it increases from 0.1 to 0.33 (by over 210%). Such increase confirms the active influence of plasma actuator in enhancing film cooling.

Figure 15:
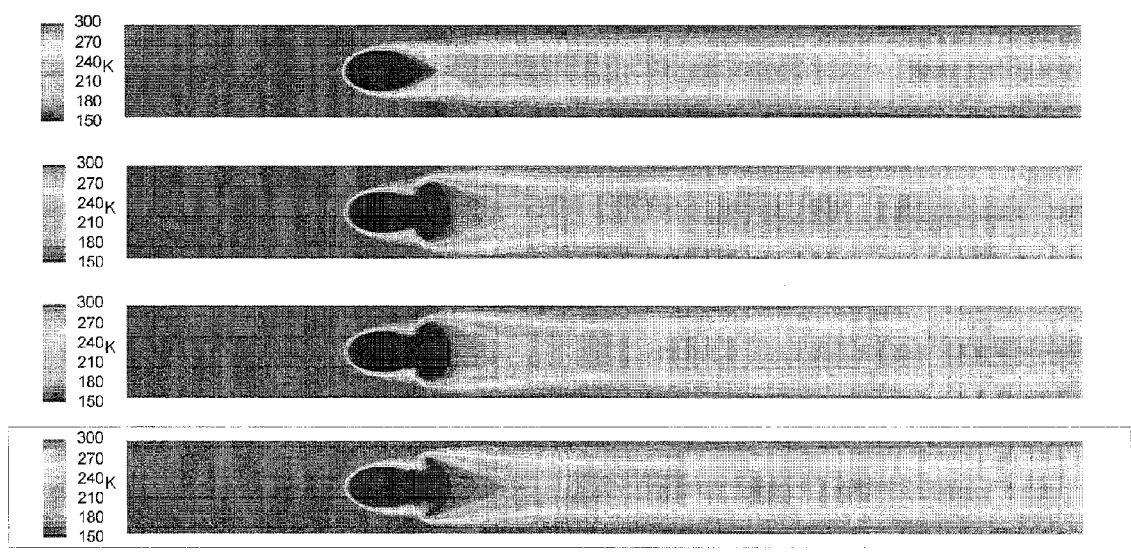
FIG. 15 shows steady state temperature contours on the plate at y=0 and for M=0.6, showing very little sign of lift-off; the top bar is for no control; the second bar is for $P_{CP}$=0, the third bar is for $P_{CP}$=−200 Pa and the fourth bar is for $P_{CP}$ −2000 Pa.
Figure 16:
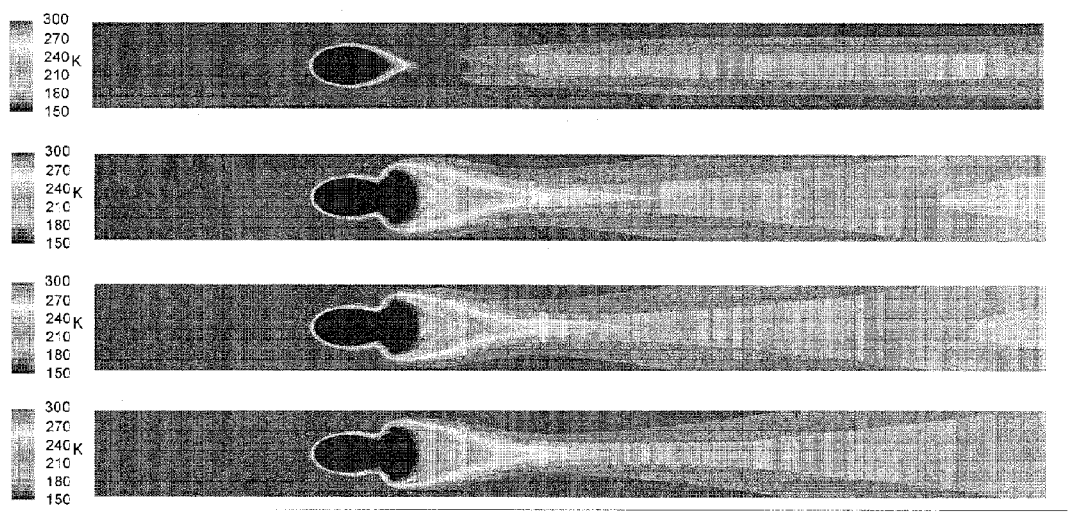
FIG. 16 shows steady state temperature contours on the plate at y=0 and for M=1, showing clear lift-off of the cold jet for the case simulated without suction control; the top bar is for no control; the second bar is for $P_{CP}$=0, the third bar is for $P_{CP}$=−200 Pa and the fourth bar is for $P_{CP}$ −2000 Pa.
Figure 17:
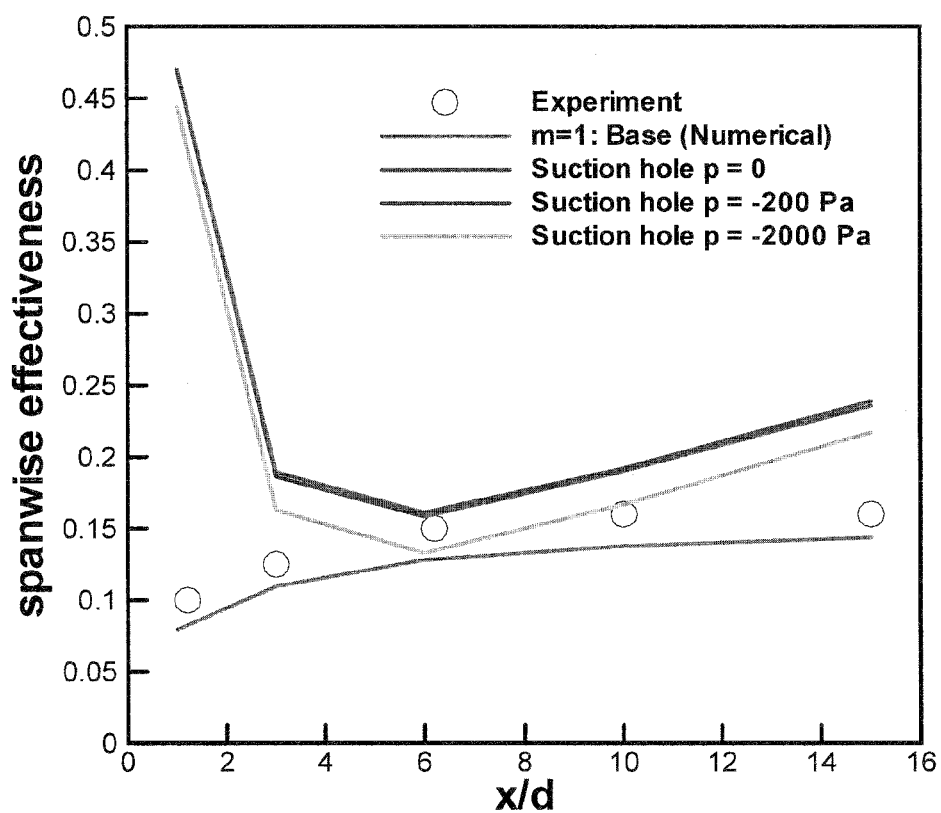
FIG. 17 shows the effect of suction hole downstream of cooling hole.

FIG. 15-17 plots the effect of suction hole placed in the CP region. The suction hole ends at x/d=1. Computed temperature distribution along the work surface are shown for the base case for two different blowing ratio, M=0.6 and 1.0. FIG. 15 shows the well known result about how the jet stay attached at low blowing ratios, 0.6 in this case. The attachment and hence the cooling effectiveness is further increased by using a small suction of $P_{cp}$=0, −200 and −2000 Pa respectively. Interestingly, $P_{cp}$ of 0 and −200 Pa work better than the case of −2000 Pa. While for moderately higher blowing ratio of M=1.0 the jet lifts off diminishing the cooling performance, similar effect is also seen in FIG. 16. The jet attaches completely just downstream of the cooling hole increasing the centerline effectiveness drastically by 300% (from 0.1 to 0.3) at x/d=2. Even though the cool jet does not remain attached further downstream and the cooling performance increases from 0.1 to 0.2 at x/d=15.

FIG. 15 shows steady state temperature contours on the plate at y=0 and for M=0.6, showing very little sign of lift-off; the top bar is for no control; the second bar is for $P_{CP}$=0, the third bar is for $P_{CP}$=−200 Pa and the fourth bar is for $P_{CP}$ −2000 Pa.

FIG. 16 shows steady state temperature contours on the plate at y=0 and for M=1, showing clear lift-off of the cold jet for the case simulated without suction control; the top bar is for no control; the second bar is for $P_{CP}$=0, the third bar is for $P_{CP}$=−200 Pa and the fourth bar is for $P_{CP}$ −2000 Pa. FIG. 17 shows the effect of suction hole downstream of cooling hole.

FIGS. 20-23 describe the effect of the imposed (plasma actuator) body force density on film cooling for the second set of simulations.

Figure 20:
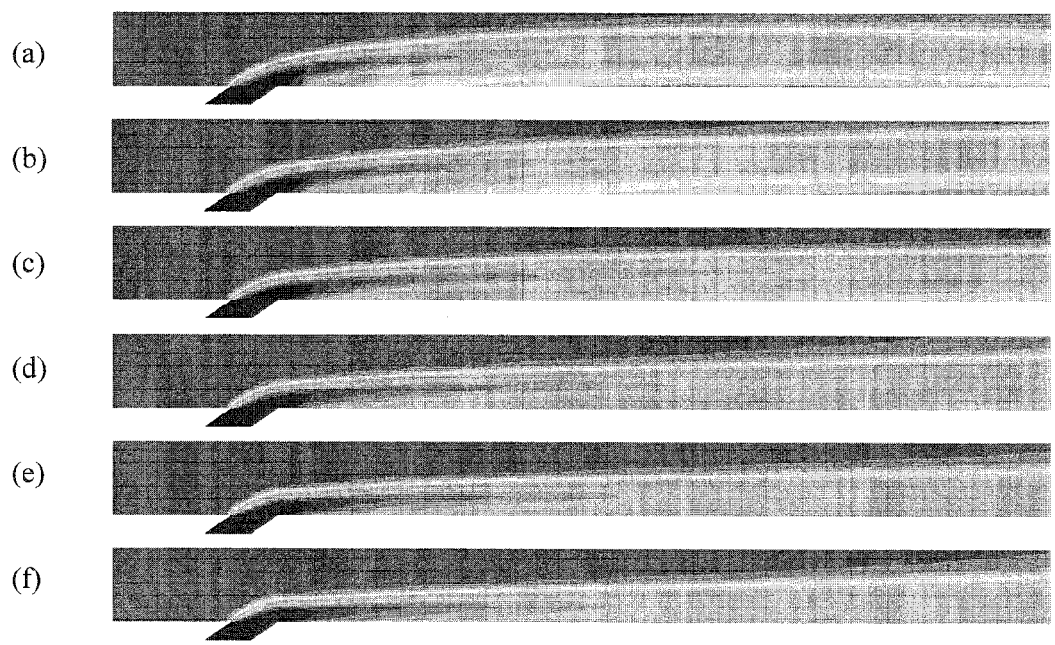
FIG. 20 shows a temperature profile (red=300K, blue=150K) along the vertical plane at z=0 plane for $F_{max}$=(a) 0, (b) 2000, (c) 4000, (d) 6000, (e) 8000, (f) 10000 kN/m$^3$.
Figure 21:
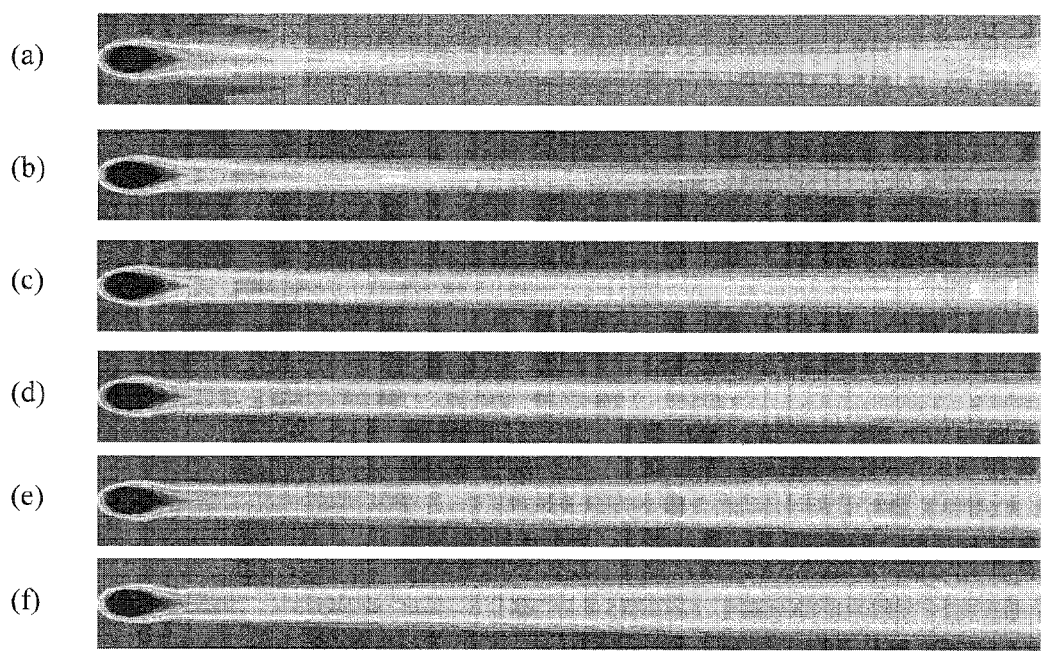
FIG. 21 shows a temperature contour on the work surface (y=0) and shows cooling flow attachment as actuation body force increases with $F_{max}$=(a) 0, (b) 2000, (c) 4000, (d) 6000, (e) 8000, (f) 10000 kN/m$^3$.

FIG. 20 plots the temperature distribution on the vertical mid-plane (z=0). It is easy to see from the temperature distribution how the lift-off causes significant reduction in cooling effectiveness. As the body force density is increased from an initial zero ($F_{max}$=0, no actuator) to a maximum of $F_{max}$=10000 $kN/m^3$ (effective force ~N) the flow completely attaches to work surface. Note that this could be done actively either by embedded sensing of the blowing ratio or the mean effectiveness on the work surface. FIG. 21 shows the temperature distribution on the horizontal work surface (y=0). Importantly, the actuation force applied in a three-dimensional manner demonstrates successful spreading of the cold film over the flat (blade) surface not only in the streamwise direction but also in the crosswise fashion. Thus the cooling performance should reflect such improvement.

Figure 22:
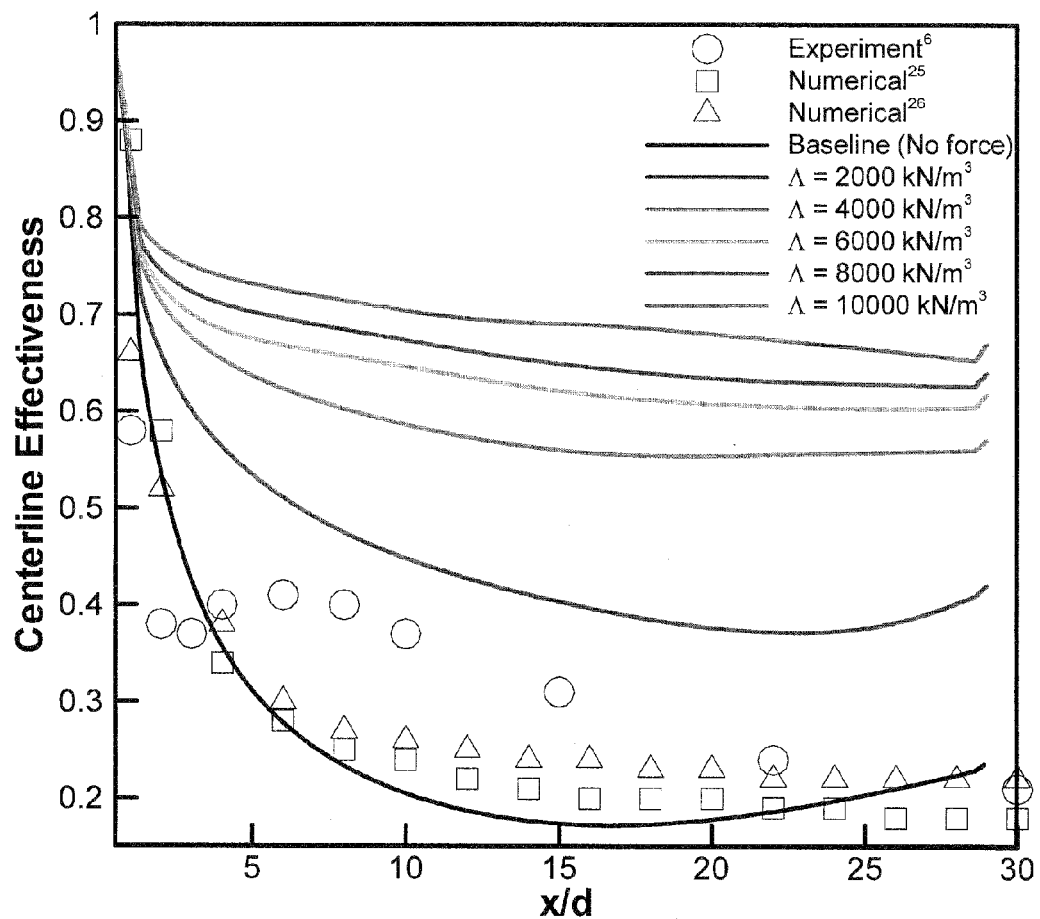
FIG. 22 shows the effect of actuator force density, showing significant increase in centerline effectiveness ($\eta_c$).
Figure 23:
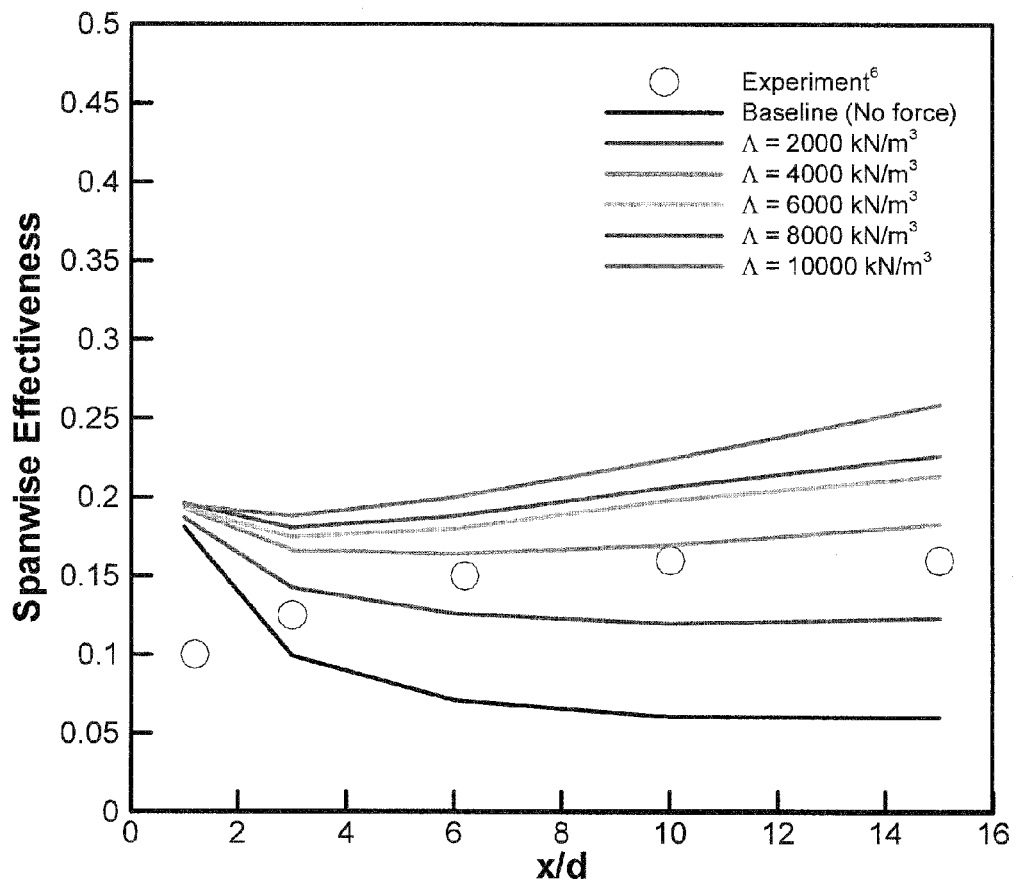
FIG. 23 shows the effect of actuator force density, showing significant increase in spanwise effectiveness ($\eta_s$).

FIG. 22 plots the centerline effectiveness ($\eta_c$) while FIG. 23 shows the spanwise averaged effectiveness ($\eta_s$) over the work surface. The computed centerline results for the base case (no control) compares reasonably with prior research. At x/d=5 the effect of plasma actuation is evident. FIG. 22 shows $\eta_c$ increases by over 100% as the force density increases to the maximum. FIG. 23 shows $\eta_s$ also improves demonstrating the three dimensional flow control. Interestingly, this $\eta_s$ keeps on increasing with distance from the cooling hole. For example, at x/d=1, the effective increases from 0.18 to 0.2 as $F_{max}$ varies from 0 to 10000 kN/m³; at x/d=6, it increases from 0.07 to 0.19; at x/d=15, it increases from 0.06 to 0.22 (by over 250%). Such increase confirms the active influence of plasma actuator in enhancing film cooling.

Figure 24:
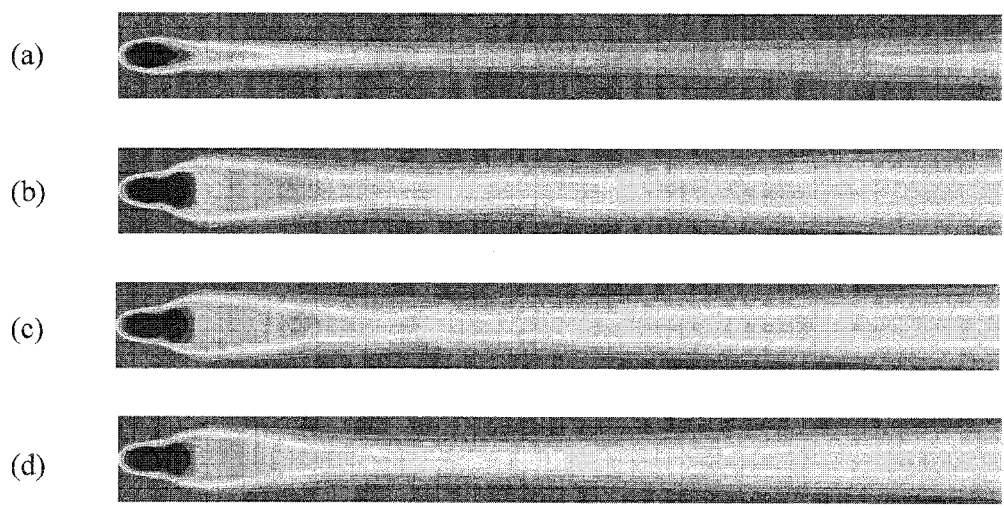
FIG. 24 shows steady state temperature contours on the plate at y=0 and for M=1, showing clear lift-off of the cold jet for the cases (a) without suction, (b) $\Delta P_{CP}$=2823 Pa, (c) $\Delta P_{CP}$=3376 Pa, and (d) $\Delta P_{CP}$=4438 Pa.
Figure 25:
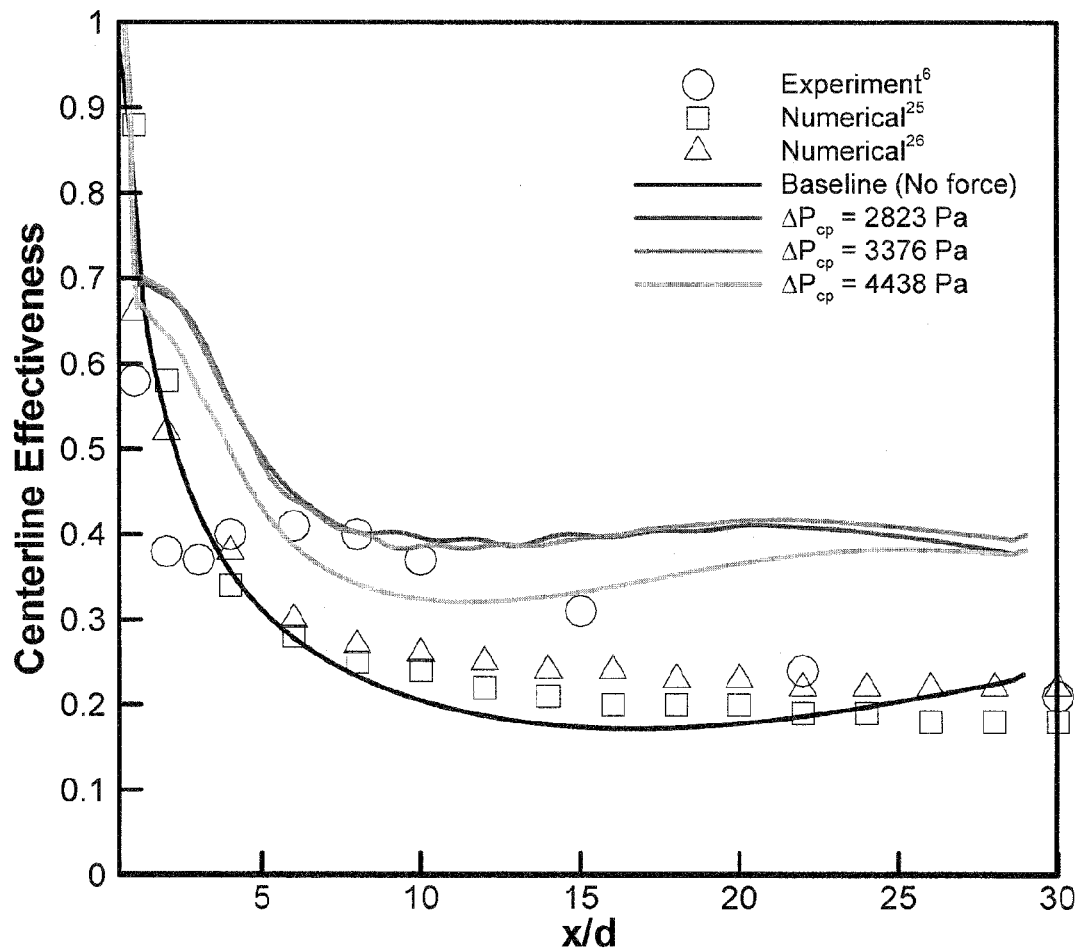
FIG. 25 shows the effect of suction, showing significant increase in centerline effectiveness ($\eta_c$).
Figure 26:
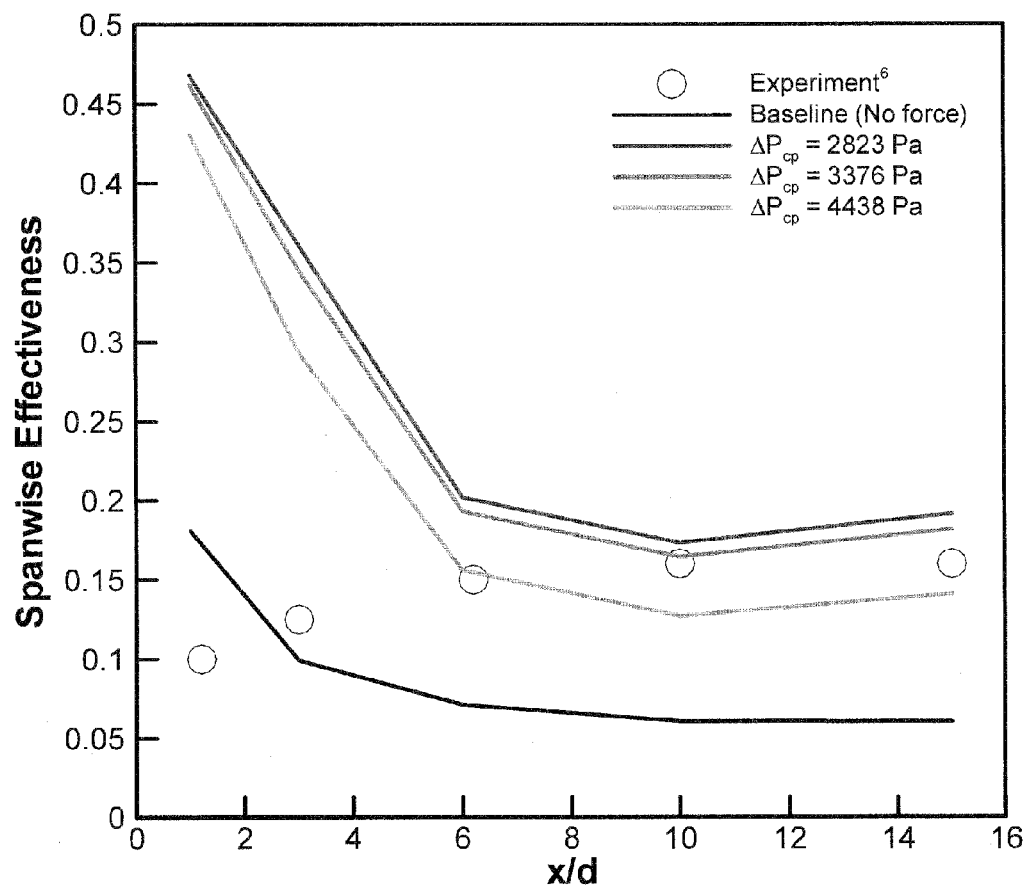
FIG. 26 shows the effect of suction, showing significant increase in spanwise effectiveness ($\eta_s$).

FIGS. 24-26 plot the effect of suction hole placed in the CP region. The suction hole ends at x/d=1. Computed temperature distribution along the work surface is shown. FIG. 24 shows the well known result about how the jet lifts off diminishing the cooling performance at blowing ratio of M=1.0 in this case. The attachment and hence the cooling effectiveness is further increased by using a small suction of $\Delta P_{CP}$=2823, 3376, and 4438 Pa respectively. Interestingly, $\Delta P_{CP}$ of 2823 and 3376 Pa work better than the case of 4438 Pa. FIG. 25 shows a good improvement of centerline effectiveness ($\eta_c$) by 50% at x/d=5. The jet attaches completely just downstream of the cooling hole increasing $\eta_c$ drastically by 260% (from 0.1 to 0.36) at x/d=3 in FIG. 26. Even though the cool jet does not remain attached further downstream, the cooling performance increases from 0.06 to 0.2 at x/d=15 for $\Delta P_{CP}$=2823 Pa.

Thus, the embodiments shown in FIG. 3A and FIG. 3B improve film cooling. The embodiment of FIG. 3A uses a plasma actuator, and the embodiment of FIG. 3B uses suction just downstream of the cooling hole to show significant enhancement in streamwise and lateral cooling, improving the effectiveness by over 150%. In the near field region, suction works better for improving cooling performance, while plasma actuator induced body force works uniformly well along the entire blade surface.

Figure 18A:
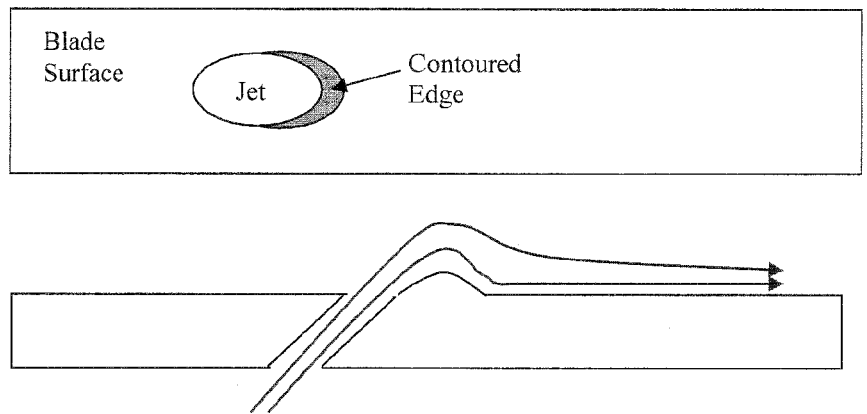
FIG. 18A shows a contoured edge design for improved film cooling.

Another configuration, as shown in FIG. 18A, uses a contoured tab for guiding the cold flow to attach the flow to the blade surface. Importantly, such control is not varying with the transient nature with the flow and is hence passive. The contours are smooth as compared to the step designs by previous researchers. The advantages include three-dimensional dispersion of the cold jet without any major loss in flow energy.

Figure 18B:
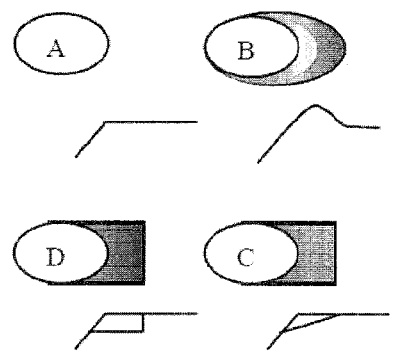
FIG. 18B shows cooling hole exit designs in accordance with embodiments of the invention.

Alternate designs of the cooling hole exit can be utilized. FIG. 18B shows schematics of various shapes of the hole exit plane: A—baseline; B—bumper with 0.5d height; C—jet hole with compound slopes, D—rectangular slot. The intension of the shapes B and D is to trip the emerging cold jet. The purpose of all these geometries is to reduce the lift-off effect of the cold jet by a tripping mechanism, so that it attaches to the surface downstream of the hole. The bump is introduced to trip the cold flow in a direct fashion. Such configurations can be used in conjunction with the designs shown in FIGS. 3A and 3B.

FIG. 19 plots the trajectories of individual cold fluid particles for the design A without any influence of plasma, and with $F_{max}$=2000 for designs B and D. These plots also provide insight into the effect of the imposed (plasma actuator) body force density on film cooling. It is worth noticing that downstream of the hole the fluid trips outward (crosswise) and downward in design B as compared to design A, while in design D the cooling jet essentially clings to the work surface. The typical single counter-rotating vortex pair in the baseline solution for design A has peak strength of about 20,000/s as cooling jet juts out. The weaker vortices move outward and away from the wall. For design B without plasma, the strength of vortex pair doubles to 40,000/s with a much larger core diameter. Application of plasma ($F_{max}$=2000) for design B splits this single vortex pair into two separate counter-rotating vortex pairs with equal strength. For design D with plasma the single vortex pair has slightly lower strength (35,000/s) with strong attachment towards the work surface inducing large dispersion of the cold jet. Accordingly, it can be inferred that surface heat transfer may not only be improved by plasma force but also be further enhanced by local tripping of the jet as it emanates from the hole.

Figure 27:
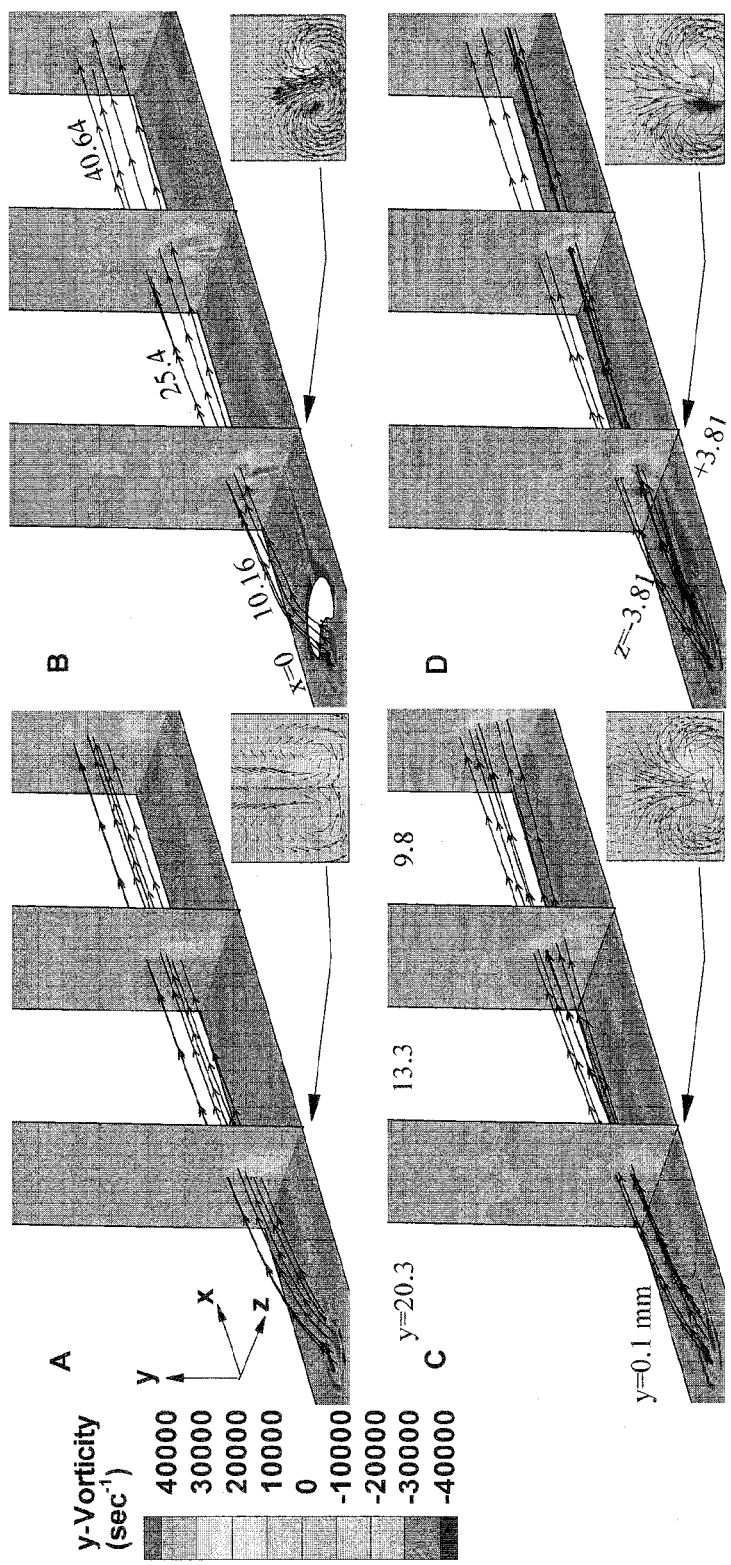
FIG. 27 shows velocity vectors and contours colored by the y-vorticity at x/d=4, 10 and 16. The inset hole schematics show various shapes for designs A-D of FIG. 18B.
Figure 28:
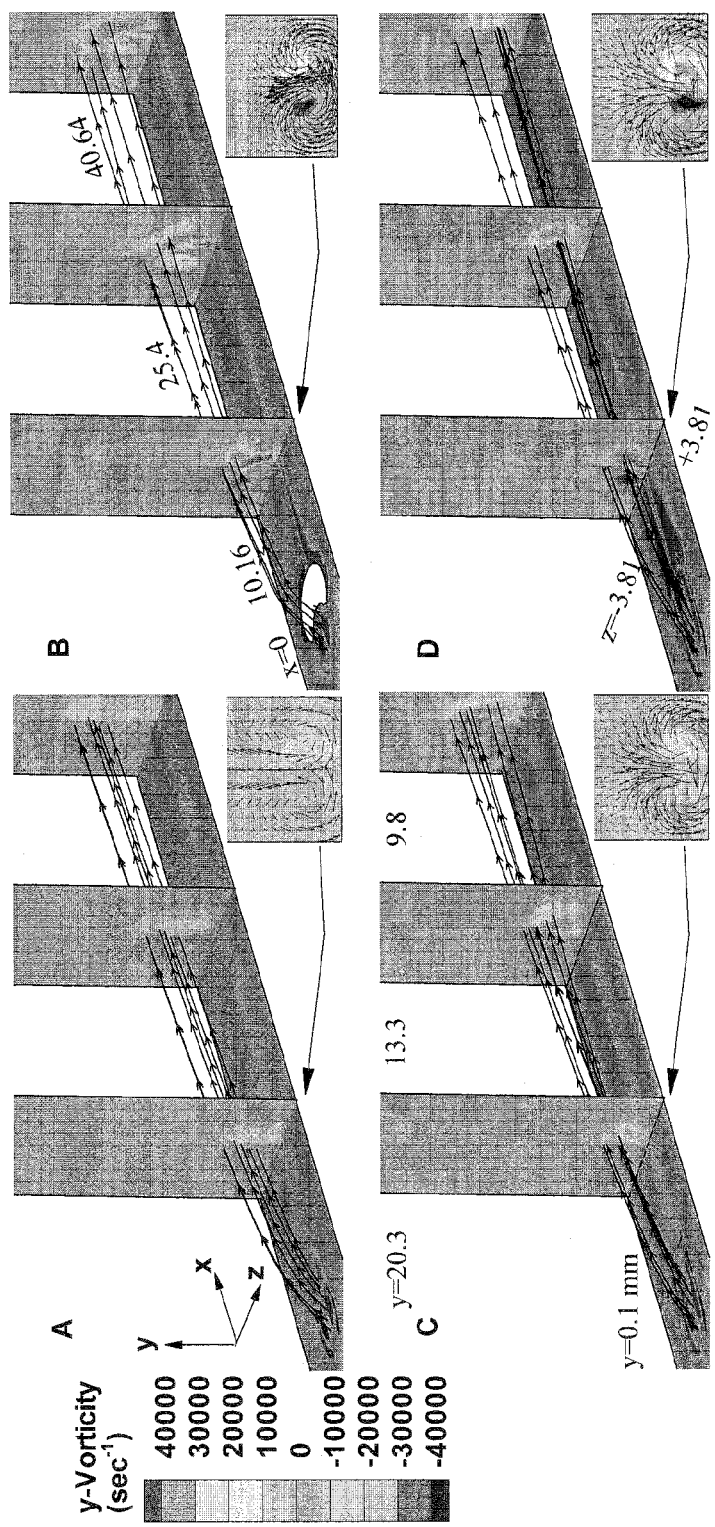
FIG. 28 shows velocity vectors and contours colored by the y-vorticity at x/d=4, 10 and 16 for designs A-D of FIG. 18B with actuation force density $F_{max}$=2000 kN/m$^3$.

FIG. 27 shows the evolution of the vortices from x/d=4 to 16 and presents y-vorticity contours with velocity vectors overlay at x/d=4 for hole shapes A, B, C and D. The baseline solution for design A shows the typical counter-rotating vortex pair with peak vortex strength of about 20,000/s as cooling jet juts out. It can be seen that the weaker vortices are moving outward and away from the wall as the distance increases. For design B the strength of vortex pair doubles to 40,000/s with a much larger core diameter. This is due to the tripping of cold jet over the bump. The peak vorticity is a few mm above the work surface. Design C shows slightly higher (25,000/s) vorticity than that of design A, but this value is substantially lower than that of designs B or D. In later design the peak is about the same as that of design B, however, it is attached to the work surface allowing significantly higher horizontal dispersion of the cooling jet. FIG. 28 plots the effect of strong downward and forward force for $F_{max}$=2000 kN/m³. For design A, the y-vorticity is lower than in FIG. 27 without plasma effect because the electric force slightly kills the strength of vortex. Clearly, for designs B-D, the counter-rotating vortex pairs change their direction from an outward swirl to an inward swirl because the downward momentum induced by the electric force is much larger than the upward momentum of the cooling jet. For design B, the single vortex pair of FIG. 28 splits into two separate vortex pairs with equal strength while for designs C and D the single vortex pair with slightly lower strength (~35,000/s) show strong attachment towards the work surface inducing large dispersion of the cold jet. Application of plasma discharge changes the near wall dynamics of flow which is also reflected in heat transfer.

Figure 29:
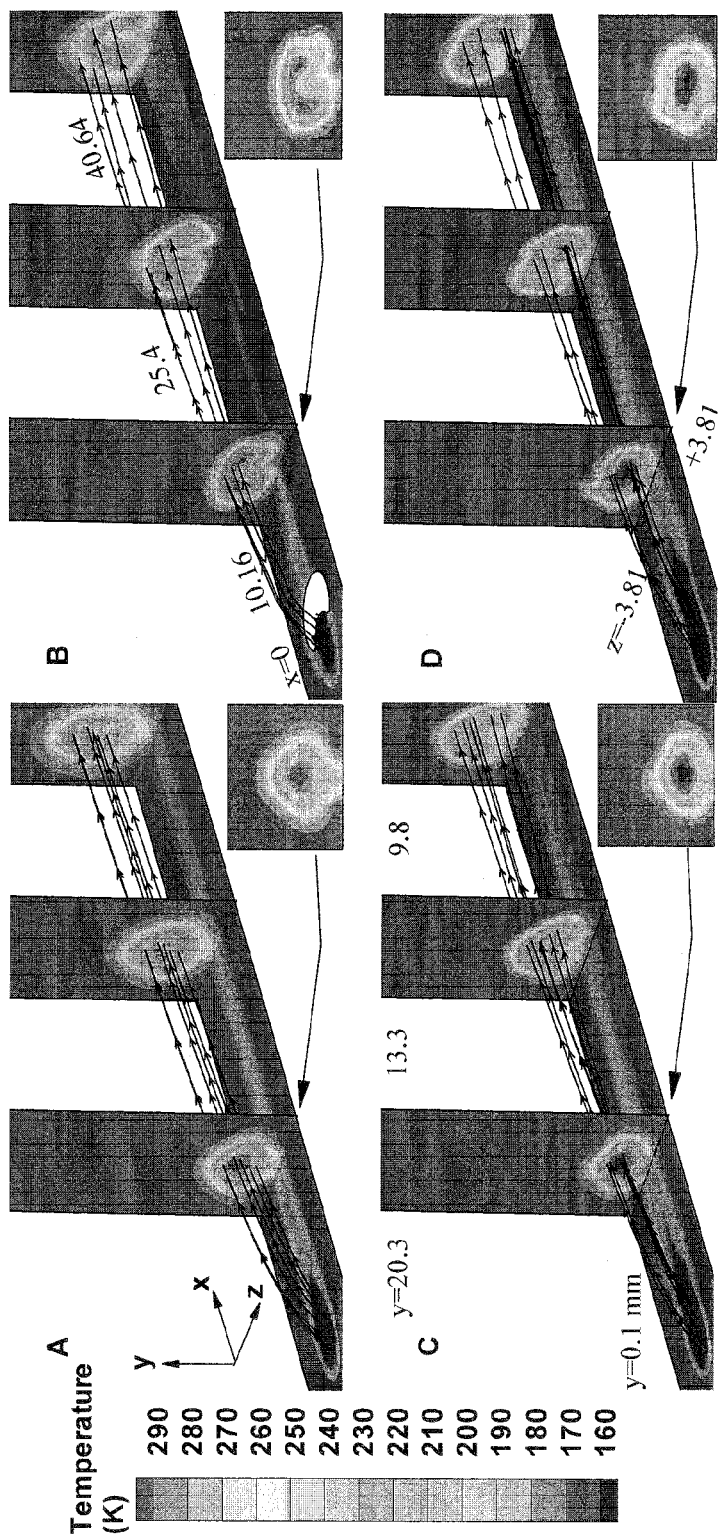
FIG. 29 shows temperature contours at spanwise plane (x/d=4, 10 and 16) for various designs A-D of FIG. 18B.
Figure 30:
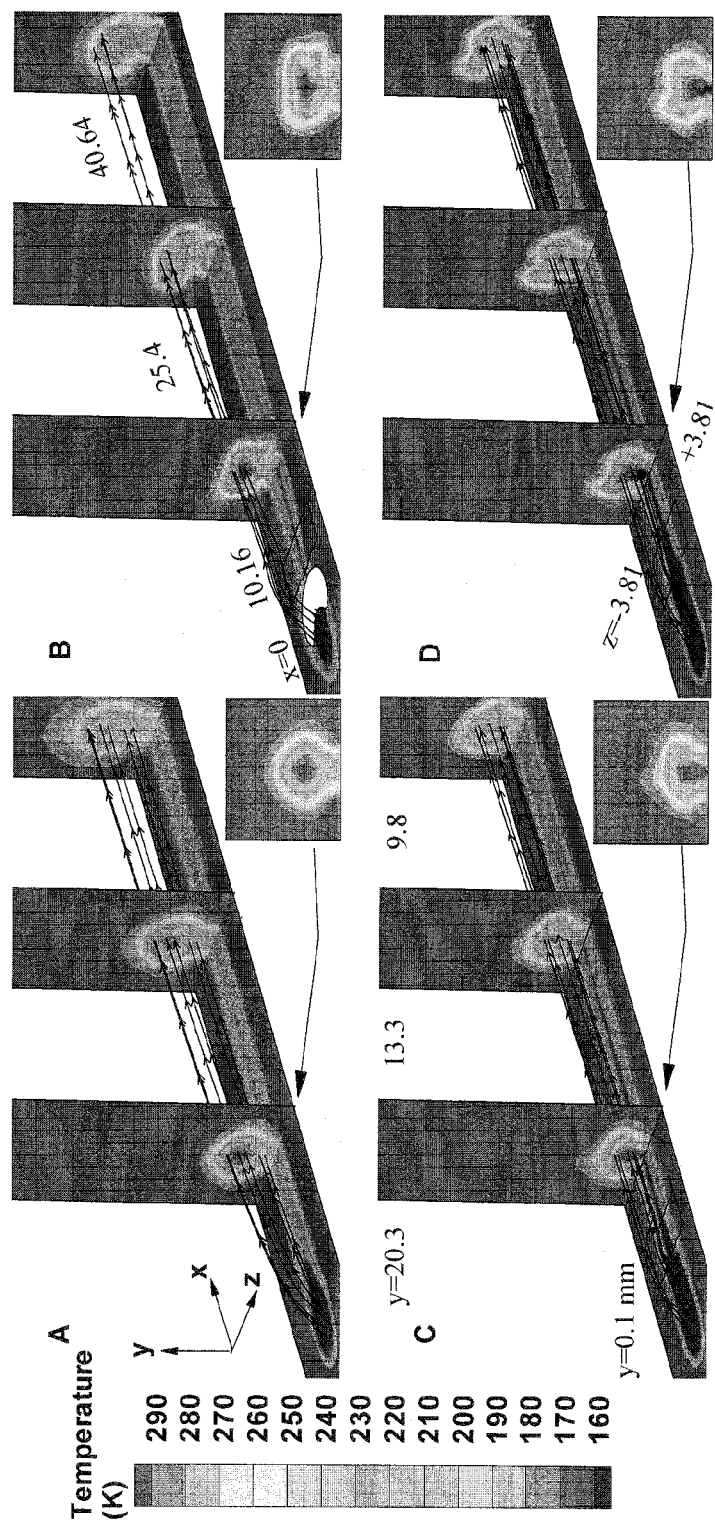
FIG. 30 shows temperature contours at spanwise plane (x/d=4, 10 and 16) for designs A-D of FIG. 18B with actuation force density $F_{max}$=2000 kN/m$^3$.

FIG. 29 plots the temperature distribution on the same planar location (x/d=4, 10, and 16) and marks y-z plane temperature distribution at x/d=4 for no actuation $F_{max}$=0. At this distance the cold fluid lifts off in traditional design A. As the distance increases at x/d=16 for design A, the lift-off effect becomes aggravated. The situation worsens for design B just beyond the bump. However, for designs C and D the cold jet bends (trips) for modest improvement of the cooling region on the work surface. In contrast, the influence of plasma induced electric force can be significant as seen in FIG. 30 for $F_{max}$=2000 kN/m³. The temperature of the work surface reduced for all designs. For design A at x/d=16, the lowest temperature 230 K on work surface is much cooler than in FIG. 29 for the same design and location. Clearly designs for B, C and D the cold jet attaches to the work surface the extent of which increases from design B to design C to design D. Accordingly, the improvement in cooling performance will be quantified.

Figure 31A:
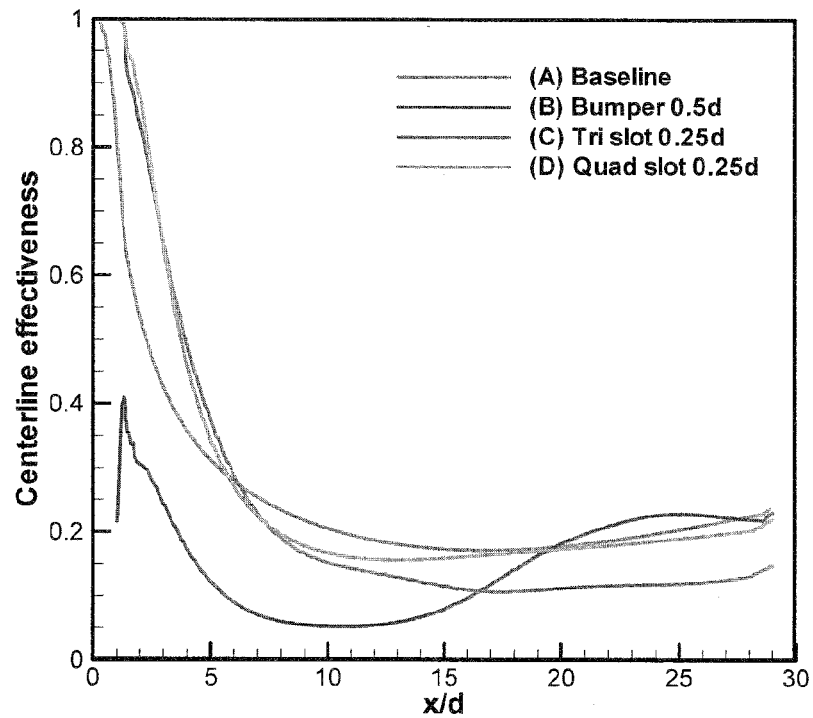
FIGS. 31A and 31B show effects of plasma actuation on centerline effectiveness ($\eta_c$) for (a) $F_{max}$=0 and (b) $F_{max}$=2000 kN/m$^3$.
Figure 31B:
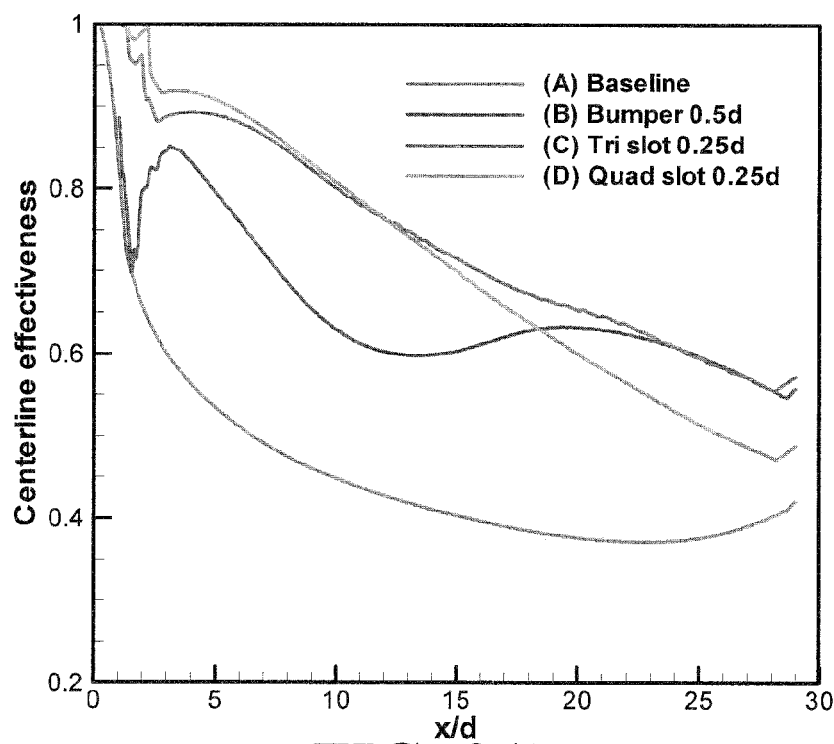
Figure 32A:
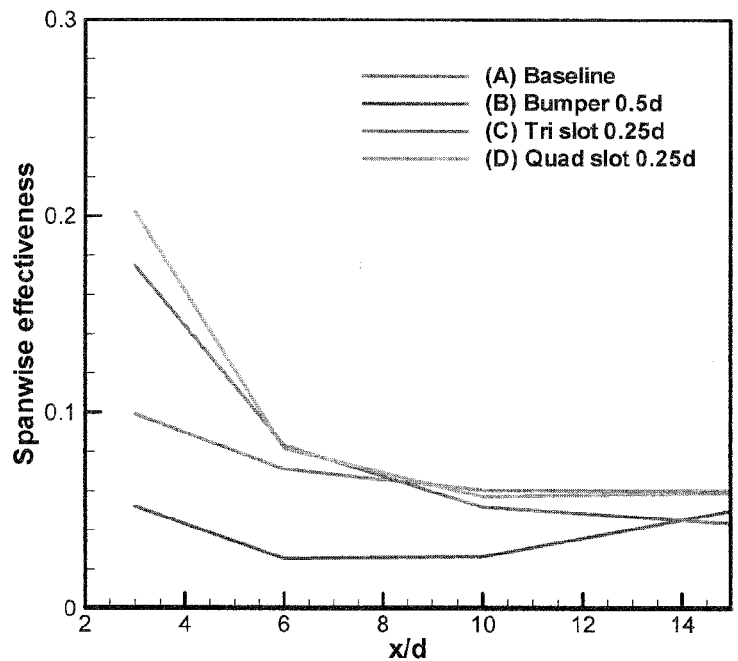
FIGS. 32A and 32B show effects of plasma actuation on spanwise effectiveness ($\eta_s$) for (a) $F_{max}$=0 and (b) $F_{max}$=2000 kN/m$^3$.
Figure 32B:
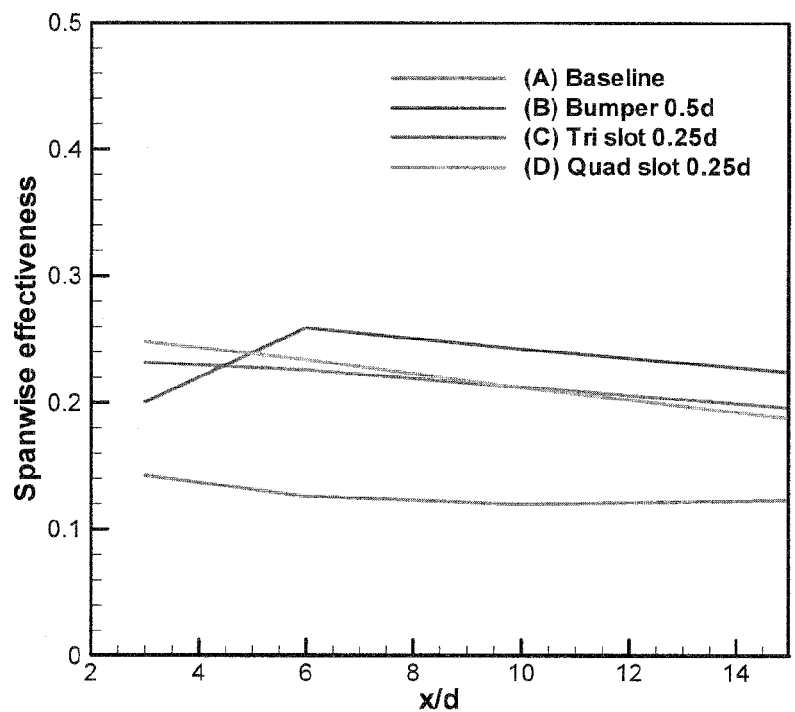

FIGS. 31A and 31B plot the effect of plasma actuation on centerline effectiveness($\eta_c$) for the four designs A-D. FIG. 31A shows the effect of geometric modifications ($F_{max}$=0) of the cooling hole. The performance plots of different hole shapes show that C and D have better $\eta_c$ before x/d=6 because the expansion of the jet reduces the momentum ratio increasing the cooling performance. Also the step at edge of D acts as a trip for the cold fluid inducing more attachment. Interestingly, case B provides higher $\eta_c$ beyond x/d=20 because the jump effect delays the cold fluid attached to the work surface. The $\eta_c$ in FIG. 31B increases by over 70%, 558%, 137%, and 164%, respectively, at x/d=5 than in FIG. 31A as the force density increases to the maximum ($F_{max}$=2000) for designs A-D. FIGS. 32A and 32B show the spanwise averaged effectiveness ($\eta_s$) for four designs A-D. FIG. 32A shows the baseline design A has better $\eta_s$ than that of B because the jump effect cause the counter-rotating vortex pair moving away from the wall. Designs C and D have good improvement over 70% in $\eta_s$ at x/d=3 because the slot design reduce the momentum of cooling jet and give more chances to cool the wall near the cooling hole. FIG. 32B shows the plasma effect of designs A-D as force density increases to the maximum ($F_{max}$=2000). Evidently plasma actuation gives a very good improvement for designs B-D. It is evident that the plasma flow control guarantees the flow is attached to the surface improving the heat transfer drastically.

A third set of simulations were performed where $F_{max}$ is varied as 0, 2, and 2000 kN/m³ for $C_1$=1.5×10⁻⁶, $C_2$=3.09× 10⁻⁶, $C_3$=0.98, $C_4$=0.057, $C_5$=1.58×10⁻⁶ $C_6$=3.14×10⁻⁶. Depending on the actuation device, a local kN/m³ force density can be obtained by spending a few watts for $F_{max}$=2 kN/m³ to kWs for $F_{max}$=2000 kN/m³.

Figure 33A:
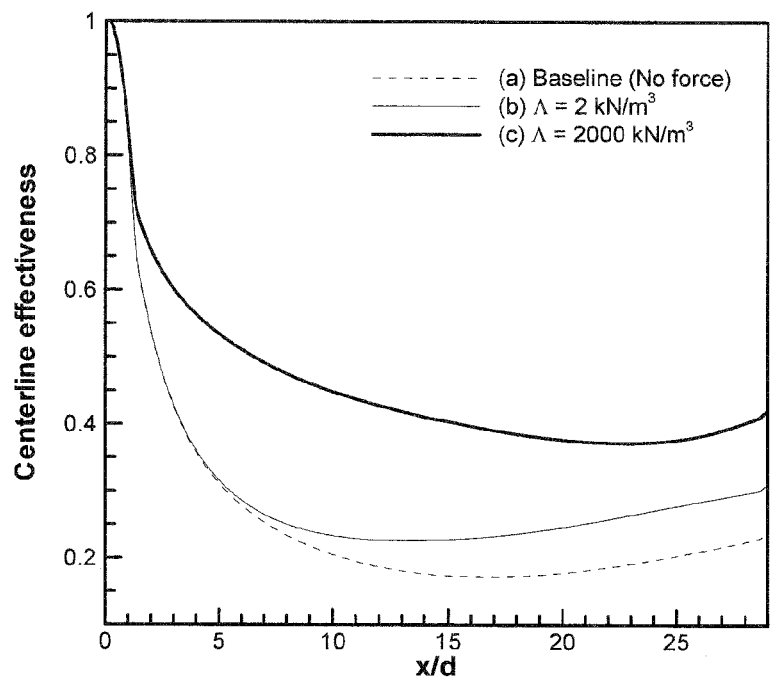
FIGS. 33A and 33B show effects of plasma force on film cooling heat transfer.
Figure 33B:
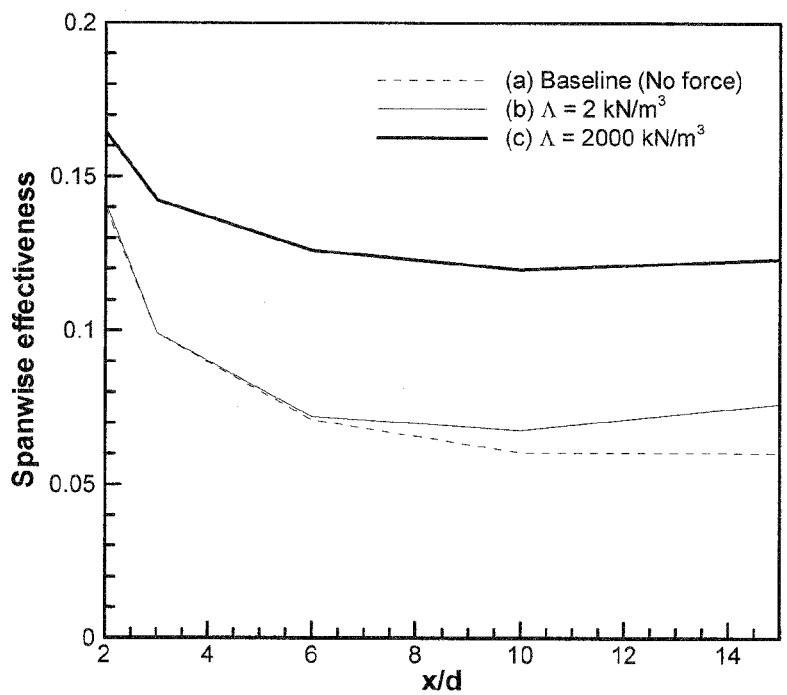

The effect of plasma discharge on the heat transfer near the work surface is compared in FIGS. 33A and 33B for $F_{max}$=0 (plasma off), and $F_{max}$=2 and 2000 kN/m³ (plasma on) for a standard slanted hole design A. In FIG. 33A, the application of a small plasma force density of $F_{max}$=2 kN/m³ caused $\eta_c$ to rise from 0.17 to 0.22 (a 30% increase) at the normalized location of x/d=15. Interestingly, the bifurcation started beyond x/d=5. As the plasma force density increases to large $F_{max}$=2000 kN/m³, $\eta_c$ starts increasing rapidly beyond x/d=1.5. When the force density is increased to 2000 kN/m³, the effectiveness shoots up from 0.17 ($F_{max}$=0) to 0.41 improving over 140%. In order to understand the spread of the cooling jet, the spanwise averaged effectiveness $\eta_s$ is plotted in FIG. 33B. Results show that for a small discharge ($F_{max}$=2) $T_{is}$ increases from 0.06 to 0.076 (26% increase) at x/d=15. The effect goes up significantly for $F_{max}$=2000 to $\eta_s$=0.125 (108% increase). Such comparisons give us insight on how the cooling jet becomes wider and attaches to work surface as the fluid interacts with the local plasma discharge.

Figure 34:
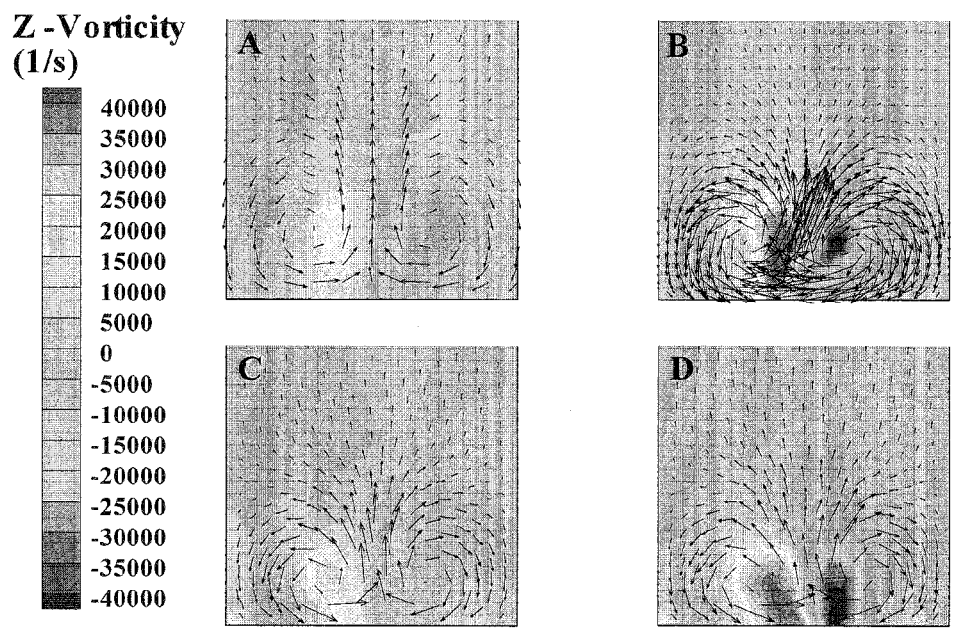
FIG. 34 shows velocity vectors and contours colored by the z-vorticity at x/d=3. The inset hole schematics show various shapes for designs A-D of FIG. 18B.

FIG. 34 presents z-vorticity contours with velocity vectors overlay at x/d=3 for hole shapes A, B, C and D. The baseline solution for design A shows the typical counter-rotating vortex pair with peak vortex strength of about 20,000/s as cooling jet juts out. Here, the weaker vortices are moving outward and away from the wall. For design B the strength of vortex pair doubles to 40,000/s with a much larger core diameter. This is due to the tripping of cold jet over the bump. The peak vorticity is a few mm above the work surface. Design C shows slightly higher (25,000/s) vorticity than that of design A, but this value is substantially lower than that of designs B or D. In later design the peak is about the same as that of design B, however, it is attached to the work surface allowing significantly higher horizontal dispersion of the cooling jet.

Figure 35:
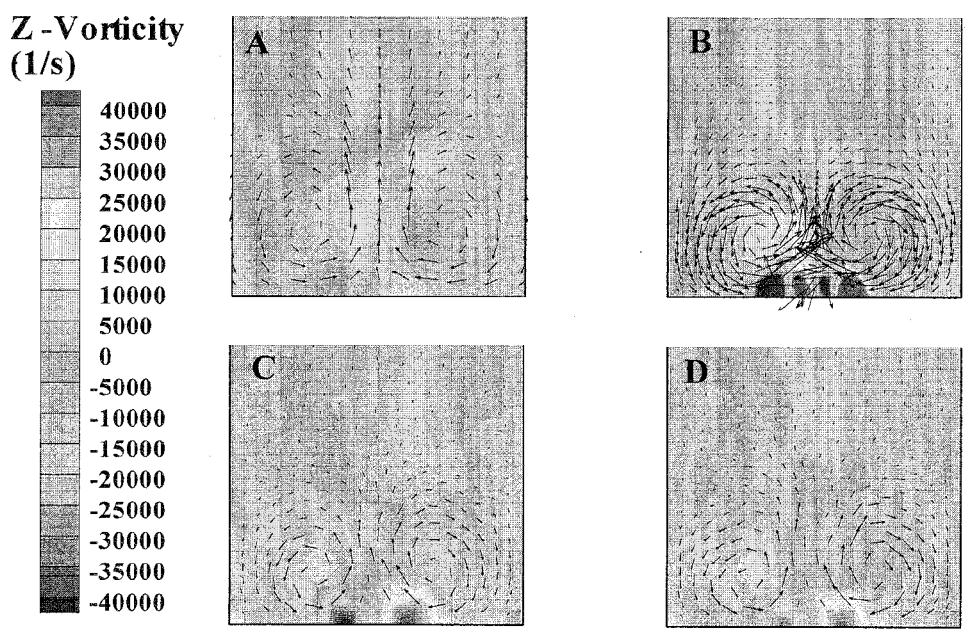
FIG. 35 shows velocity vectors and contours colored by the z-vorticity at x/d=3 for designs A-D of FIG. 18B with actuation force density $F_{max}$=2000 kN/m$^3$.

FIG. 35 plots the effect of strong downward and forward force for $F_{max}$=2000 kN/m³. Clearly, for design B the single vortex pair of FIG. 34 splits into two separate vortex pairs with equal strength while for designs C and D the single vortex pair with slightly lower strength (~35,000/s) show strong attachment towards the work surface inducing large dispersion of the cold jet. Application of plasma discharge changes the near wall dynamics of flow which is also reflected in heat transfer.

Figure 36:
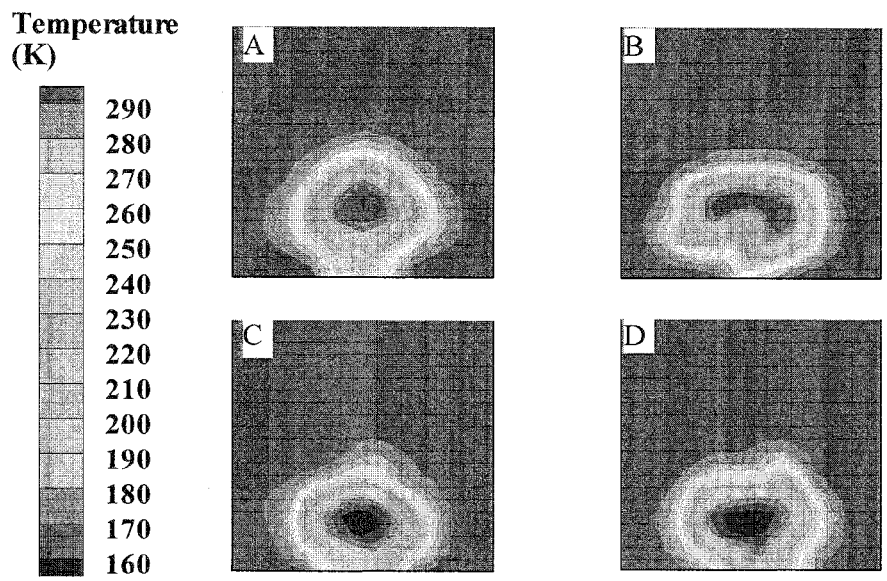
FIG. 36 shows temperature contours at spanwise plane (x/d=3) for various designs A-D of FIG. 18B.
Figure 37:
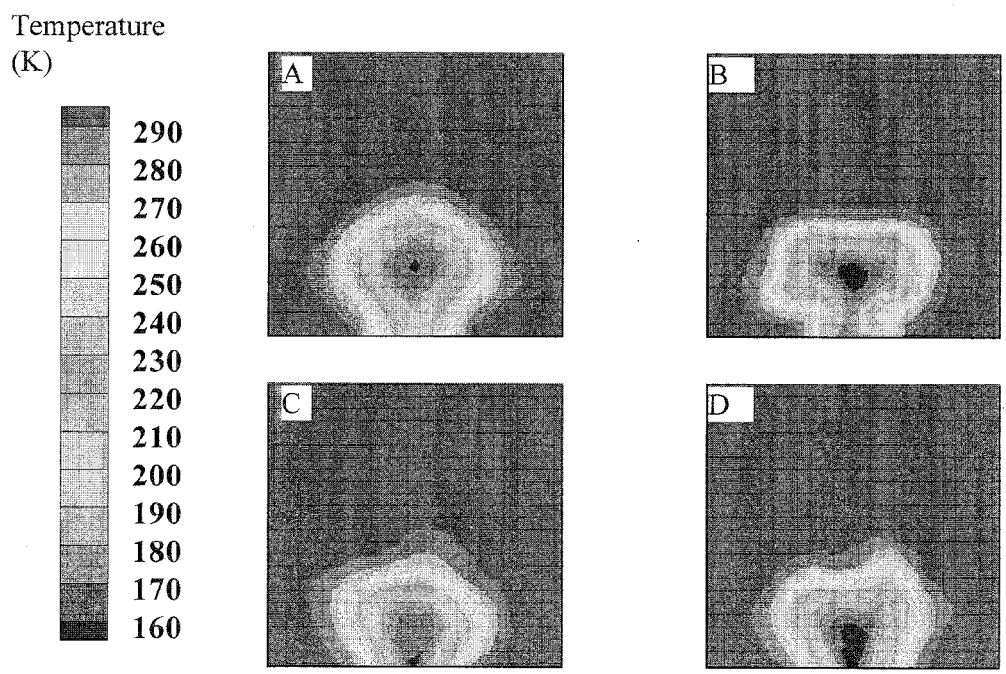
FIG. 37 shows temperature contours at spanwise plane (x/d=3) for designs A-D of FIG. 18B with actuation force density $F_{max}$=2000 kN/m$^3$.

FIG. 36 plots the temperature distribution on the same planar location (x/d=3) for no actuation $F_{max}$=0. At this distance the cold fluid lifts off in traditional design A. The situation worsens for design B just beyond the bump. However, for designs C and D the cold jet bends (trips) for modest improvement of the cooling region on the work surface. In contrast, the influence of plasma induced electric force can be significant as seen in FIG. 37 for $F_{max}$=2000 kN/m³. The temperature of the work surface reduced for all designs. Clearly for designs B, C and D the cold jet attaches to the work surface the extent of which increases from design B to design C to design D. It is thus essential to quantify the improvement in cooling performance.

Figure 38A:
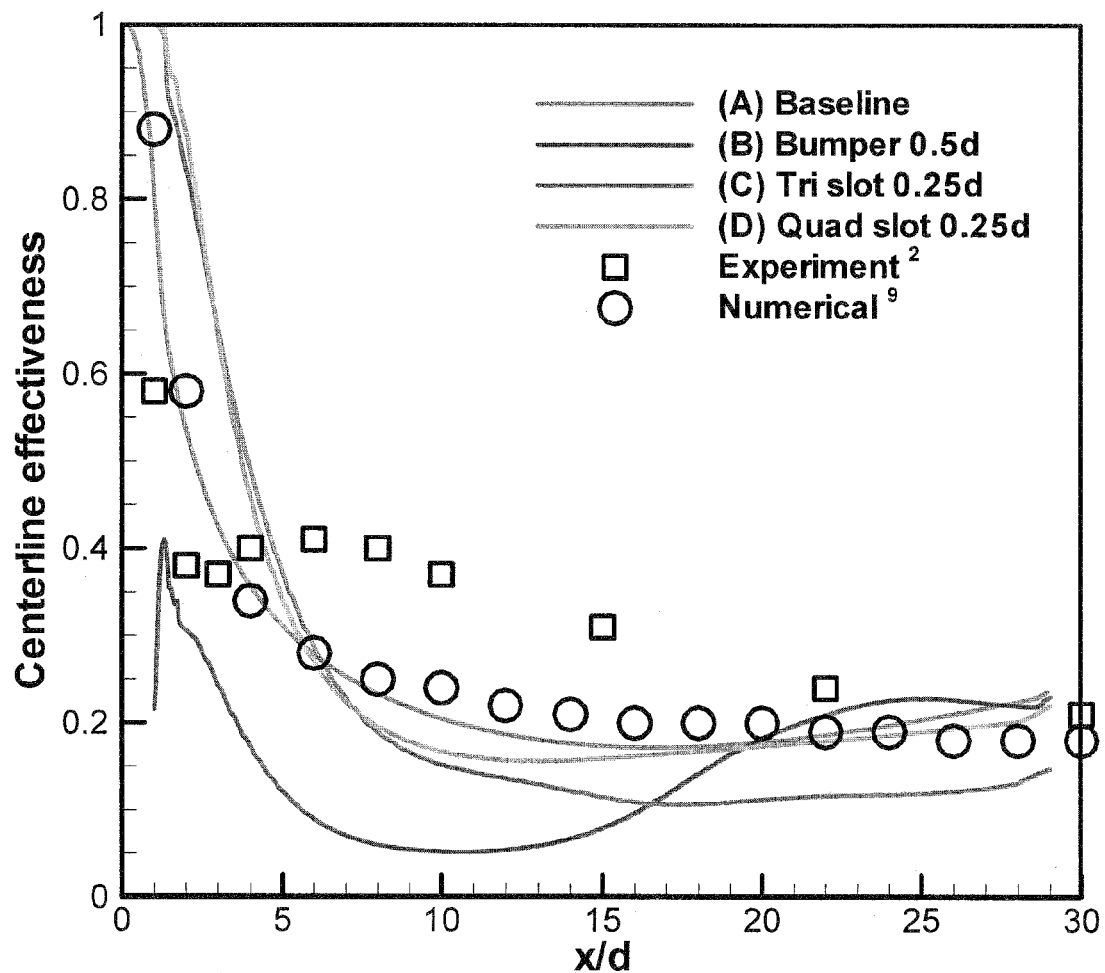
FIGS. 38A-38C show effects of plasma actuation on centerline effectiveness for (a) $F_{max}$=0, (b) $F_{max}$=2 kN/m$^3$, (c) $F_{max}$=2000 kN/m$^3$.
Figure 38B:
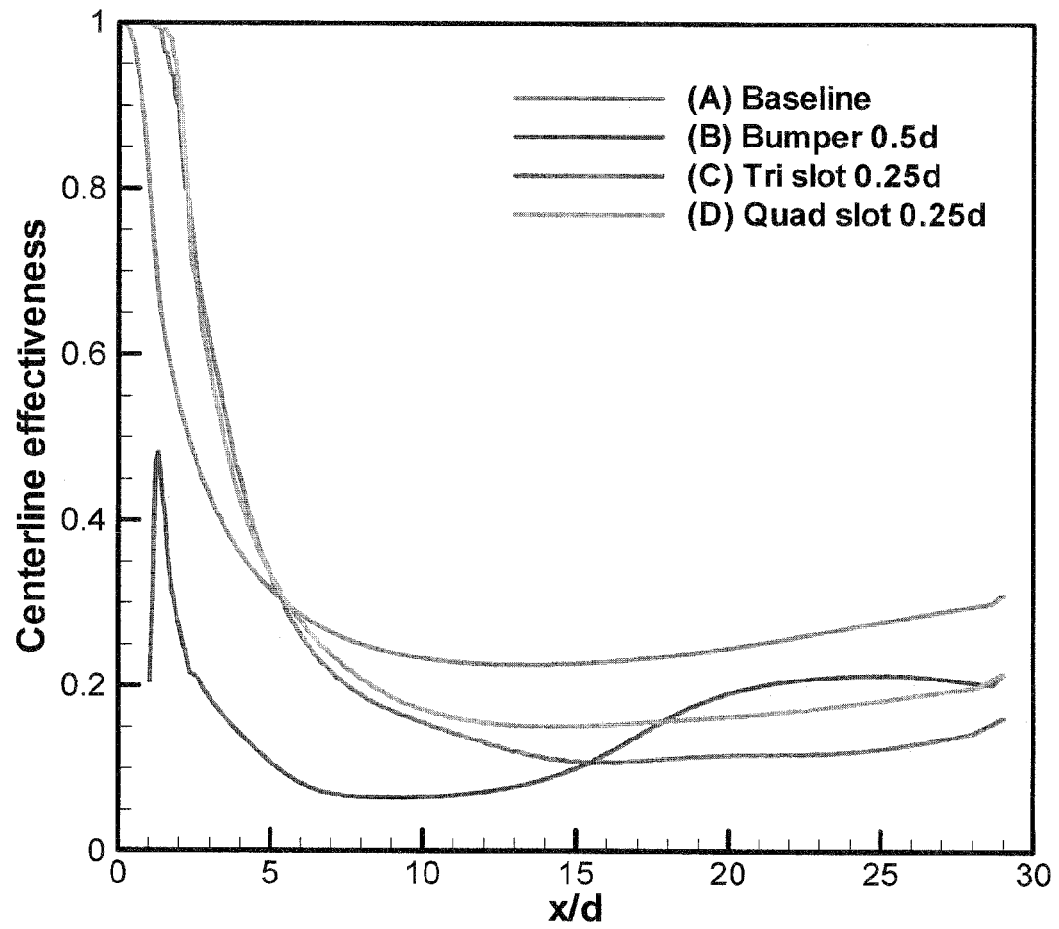
Figure 38C:
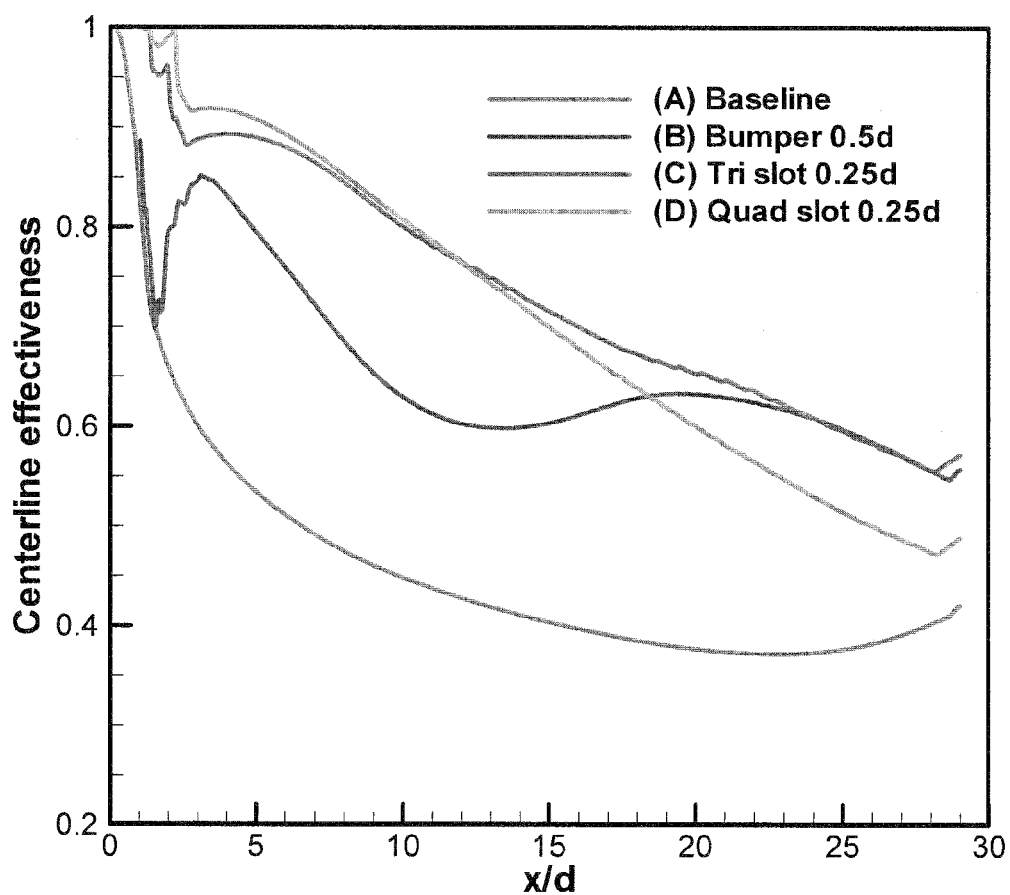

FIGS. 38A-38C plot the effect of plasma actuation on centerline effectiveness for four designs A-D. FIG. 38A shows the effect of geometric modifications ($F_{max}$=0) of the cooling hole. The computed $\eta_c$ for the baseline case without plasma discharge compares reasonably with the experimental data and other previously reported numerical results. The performance plots of different hole shapes show that designs C and D have better $\eta_c$ before x/d=6 because the expansion of the jet successfully reduces the momentum ratio increasing the cooling performance. Also the step at edge of design D acts as a trip for the cold fluid inducing more attachment. Interestingly, case B provides higher $\eta_c$ beyond x/d=20 because the jump effect delays the cold fluid attached to the work surface. In FIG. 38B, the effect of small plasma actuation is evident only for the case A beyond x/d=5 because the effect of the geometric modifications is higher than the plasma force density. The $\eta_c$ in FIG. 38C increases by over 70%, 558%, 137%, and 164% more, respectively, at x/d=5 than in FIG. 38A as the force density increases to the maximum ($F_{max}$=2000) for designs A-D. It is evident that the plasma flow control guarantees the flow is attached to the surface improving the heat transfer drastically.

Embodiments

Embodiment 1. A device for active surface cooling, comprising:

a surface to be cooled having at least one orifice for outputting a cooling gas;

a flow control plasma actuator positioned at a control patch region proximate each of the one or more of the at least one orifice to induce cooling gas attachment to the surface.

Embodiment 2. The device according to Embodiment 1, further comprising:

a cooling gas supplier, wherein the cooling gas supplier supplies cooling gas to one or more of the at least one orifice.

Embodiment 3. The device according to Embodiment 2, wherein the cooling gas supplier supplies air.

Embodiment 4. The device according to Embodiment 1, wherein the control patch region is downstream of the corresponding orifice.

Embodiment 5. The device according to Embodiment 4, further comprising: a second flow control plasma actuator positioned upstream of the corresponding orifice, wherein activation of the second flow control plasma actuator induces cooling gas attachment downstream when a hot cross flow is flowing over surface.

Embodiment 6. The device according to Embodiment 1, wherein the flow control plasma actuator comprises:

a first electrode in contact with a first dielectric layer and connected to a power source; and a ground electrode;

wherein the power source drives the first electrode with a first voltage pattern with respect to the ground electrode, wherein the first voltage pattern produces a first plasma discharge in a flow region and a first electric field pattern in the flow region.

Embodiment 7. The device according to Embodiment 6, further comprising:

a second electrode in contact with a second dielectric layer and connected to the power source, wherein the power source the second electrode with a second voltage pattern with respect to the ground electrode, wherein application of the second voltage pattern produces a second plasma discharge in the flow region and a second electric field pattern in the flow region.

Embodiment 8. The device according to Embodiment 7, wherein the first voltage pattern and the second voltage pattern have a phase difference.

Embodiment 9. The device according to Embodiment 6, wherein the first voltage pattern is a dc voltage.

Embodiment 10. The device according to Embodiment 6, wherein the first voltage pattern is an ac voltage.

Embodiment 11. The device according to Embodiment 7, where the first dielectric and the second dielectric layer are arranged in a stacked configuration, wherein the first dielectric layer contacts the second dielectric layer.

Embodiment 12. The device according to Embodiment 7, wherein the first dielectric layer and the second dielectric insulator layer have different dielectric strengths.

Embodiment 13. The device according to Embodiment 1, wherein the surface is a turbine blade surface.

Embodiment 14. The device according to Embodiment 1, wherein an exit plane of one or more of the at least one orifices comprises a contoured edge protruding from the surface to be cooled.

Embodiment 15. The device according to Embodiment 14, wherein the contoured edge comprises a bumper Embodiment 16. The device according to Embodiment 1, wherein an exit plane of one or more of the at least one orifices comprises a compound slope region recessed from the surface to be cooled.

Embodiment 17. The device according to Embodiment 1, wherein an exit plane of one or more of the at least one orifices comprises a rectangular slot recessed from the surface to be cooled.

Embodiment 18. The device according to Embodiment 1, wherein when a hot crossflow is flowing over the surface, activation of the flow control plasma actuator produces a streamwise pressure that induces cooling gas attachment to the surface.

Embodiment 19. The device according to Embodiment 18, wherein activation of the flow control plasma actuator also produces a crosswise pressure that induces cooling gas attachment to the surface.

Embodiment 20. The device according to Embodiment 1, wherein a flow of the cooling gas exiting the at least one orifice is at an angle to the surface.

Embodiment 21. The device according to Embodiment 1, further comprising:
  a suction mechanism positioned proximate the one or more of the at least one orifice, wherein the section mechanism is positioned downstream of the one or more of the at least one orifice, wherein the suction mechanism induces cooling gas attachment to the surface by creating a suction pressure.

Embodiment 22. A device for active surface cooling, comprising:
  a surface to be cooled having at least one orifice for outputting a cooling gas; and
  a suction mechanism positioned proximate the one or more of the at least one orifice, wherein the section mechanism is positioned downstream of the one or more of the at least one orifice, wherein the suction mechanism induces cooling gas attachment to the surface by creating a suction pressure.

Embodiment 23. The device according to Embodiment 22, further comprising a cooling gas supplier wherein the cooling gas supplier supplies cooling gas to one or more of the at least one orifice.

Embodiment 24. The device according to Embodiment 23, wherein the cooling gas supplier supplies air.

Embodiment 25. The device according to Embodiment 21, wherein the surface is a turbine blade surface.

Embodiment 26. The device according to Embodiment 21, wherein an exit plane of one or more of the at least one orifices comprises a contoured edge protruding from the surface to be cooled.

Embodiment 27. The device according to Embodiment 26, wherein the contoured edge comprises a bumper.

Embodiment 28. The device according to Embodiment 22, wherein an exit plane of one or more of the at least one orifices comprises a compound slope region recessed from the surface to be cooled.

Embodiment 29. The device according to Embodiment 22, wherein an exit plane of one or more of the at least one orifices comprises a rectangular slot recessed from the surface to be cooled.

Embodiment 30. A device for active surface cooling, comprising:
  a surface to be cooled having at least one orifice for outputting a cooling gas; and
  a corresponding one or more contoured tabs positioned proximate the one or more of the at least one orifice, wherein the corresponding one or more contoured tabs guide the cooling air to attach the cooling gas flow to the surface.

Embodiment 31. The device according to Embodiment 30, further comprising:
  a cooling gas supplier, wherein the cooling gas supplier supplies cooling gas to one or more of the at least one orifice.

Embodiment 32. The devoce according to Embodiment 30, wherein the surface is a turbine blade surface.

Embodiment 33. The device according to Embodiment 31, wherein the cooling gas supplies air.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application. For example, while embodiments may refer to a turbine, the teachings of the disclosure may also be use with other engineering applications.

The invention claimed is:

1. A device, comprising:
  a surface;
  an orifice positioned in the surface,
    wherein a cooling gas is output from the orifice such that the cooling gas output from the orifice has a cooling gas temperature and has a component of flow in a downstream direction, and
    wherein the downstream direction is parallel to the surface where the cooling gas is output from the orifice;
  a suction hole positioned in the surface proximate the orifice,
    wherein the suction hole has a pressure, Ps,
    wherein at least a portion of the suction hole is positioned downstream from the orifice,
    wherein at least another portion of the suction hole is positioned cross stream from the orifice,
    wherein a cross stream direction is perpendicular to the downstream direction, wherein the cross stream direction is parallel to the surface where the cooling gas is output from the orifice, wherein the device is configured such that when a hot flow of a gas or gas mixture having a hot flow temperature greater than the cooling gas temperature and having a flow pressure, Pf, greater than Ps, is flowing over the surface in the downstream direction over the orifice, a streamwise pressure and a crosswise pressure are caused by a pressure differential, ΔP, where ΔP=Pf−Ps, wherein the streamwise pressure and the crosswise pressure cause a force having a component of force in the cross stream direction to be exerted on the cooling gas output from the orifice, and wherein the force having the component of force in the cross stream direction exerted on the cooling gas output from the orifice enhances attachment of the cooling gas output from the orifice to the surface.

2. The device according to claim 1, wherein the cooling gas is air.

3. The device according to claim 1, wherein the surface is a turbine blade surface.

4. The device according to claim 1,
wherein an exit plane of the orifice comprises a contoured edge protruding from the surface, and
wherein the contoured edge protruding from the surface has a continuously curving smooth shape.

5. The device according to claim 4, wherein the contoured edge comprises a bumper.

6. The device according to claim 1, wherein an exit plane of the orifice comprises a compound slope region recessed from the surface.

7. The device according to claim 1, wherein an exit plane of the orifice comprises a rectangular slot recessed from the surface.

8. The device according to claim 1,
wherein ΔP is constant.

9. The device according to claim 1,
wherein the force having the force component in the cross stream direction exerted on the cooling gas output from the orifice pushes the cooling gas output from the orifice away from the orifice such that the cooling gas loses momentum and falls onto the surface.

10. The device according to claim 1,
wherein the streamwise pressure is a streamwise pressure pulsation and the crosswise pressure is a crosswise pressure pulsation.

11. The device according to claim 1,
wherein the hot flow of the gas or gas mixture is air.

12. The device according to claim 1,
wherein a first portion of the suction hole is downstream from the orifice, and
wherein a second portion of the suction hole is both downstream from the orifice and cross stream from the orifice.

13. The device according to claim 12,
wherein a third portion of the suction hole is cross stream from the orifice.

14. The device according to claim 1, further comprising:
a flow control plasma actuator,
wherein at least a portion of the flow control plasma actuator is upstream from the orifice,
wherein when the hot flow of the gas or gas mixture is flowing over the surface in the downstream direction over the orifice, the flow control actuator is actuated such that actuation of the flow control actuator causes a second force having a second force component in the cross stream direction to be exerted on the hot flow flowing toward the orifice, and wherein the second force having the second force component in the cross stream direction exerted on the hot flow flowing toward the orifice enhances attachment of cooling gas output from the orifice to the surface.

15. The device according to claim 14,
wherein the flow control plasma actuator comprises:
a first electrode in contact with a first dielectric layer and connected to a power source; and
a ground electrode,
wherein the power source drives the first electrode with a first voltage pattern with respect to the ground electrode, and
wherein the first voltage pattern produces a first plasma discharge proximate the orifice and a first electric field pattern proximate the orifice.

16. The device according to claim 15, wherein the first voltage pattern is a dc voltage.

17. The device according to claim 15, wherein the first voltage pattern is an ac voltage.

18. The device according to claim 15, further comprising:
a second electrode in contact with a second dielectric layer and connected to the power source,
wherein the power source drives the second electrode with a second voltage pattern with respect to the ground electrode, and
wherein application of the second voltage pattern produces a second plasma discharge in the control patch region and a second electric field pattern in the control patch region.

19. The device according to claim 18, wherein the first voltage pattern and the second voltage pattern have a phase difference.

20. A device, comprising:
a surface;
an orifice positioned in the surface,
wherein a cooling gas is output from the orifice such that the cooling gas output from the orifice has a cooling gas temperature and has a component of flow in a downstream direction, and
wherein the downstream direction is parallel to the surface where the cooling gas is output from the orifice; and
a flow control plasma actuator positioned proximate the orifice,
wherein at least a portion of the flow control plasma actuator is positioned downstream from the orifice,
wherein at least another portion of the flow control plasma actuator is positioned cross stream from the orifice,
wherein a cross stream direction is perpendicular to the downstream direction,
wherein the cross stream direction is parallel to the surface where the cooling gas is output from the orifice,
wherein the device is configured such that when a hot flow of a gas or a gas mixture, with a hot flow temperature greater than the cooling gas temperature, is flowing over the surface in the downstream direction over the orifice, the flow control plasma actuator is actuated such that actuation of the flow control plasma actuator causes a force having a force component in the cross stream direction to be exerted on the cooling gas output from the orifice, and
wherein the force having the force component in the cross stream direction exerted on the cooling gas output from the orifice enhances attachment of the cooling gas flow output from the orifice to the surface.

21. The device according to claim 20,
wherein the force having the force component in the cross stream direction exerted on the cooling gas output from the orifice pushes the cooling gas output from the orifice away from the orifice such that the cooling gas loses momentum and falls onto the surface.

22. The device according to claim 20,
wherein the force having the force component in the cross stream direction exerted on the cooling gas output from the orifice pushes the cooling gas output from the orifice toward the orifice such that the cooling gas loses momentum and falls onto the surface.

23. The device according to claim 20,
wherein the actuation of the flow control plasma actuator produces pressure pulsations.

24. The device according to claim 20,
wherein the hot flow of the gas or gas mixture is air.

25. The device according to claim 20,
wherein a first portion of the flow control plasma actuator is downstream from the orifice, and
wherein a second portion of the flow control plasma actuator is both downstream from the orifice and cross stream from the orifice.

26. The device according to claim 25,
wherein a third portion of the flow control plasma actuator is cross stream from the orifice.

27. The device according to claim 25, further comprising:
a second flow control plasma actuator,
wherein at least a portion of the second flow control plasma actuator is upstream from the orifice,
wherein when the hot flow of the gas or gas mixture is flowing over the surface in the downstream direction over the orifice, the second flow control actuator is actuated such that actuation of the second flow control actuator causes a second force having a second force component in the cross stream direction to be exerted on the hot flow flowing toward the orifice, and
wherein the second force having the second force component in the cross stream direction exerted on the hot flow flowing toward the orifice enhances attachment of cooling gas output from the orifice to the surface.

28. The device according to claim 20, wherein the cooling gas is air.

29. The device according to claim 20,
wherein the flow control plasma actuator comprises:
a first electrode in contact with a first dielectric layer and connected to a power source; and
a ground electrode,
wherein the power source drives the first electrode with a first voltage pattern with respect to the ground electrode, and
wherein the first voltage pattern produces a first plasma discharge proximate the orifice and a first electric field pattern proximate the orifice.

30. The device according to claim 29, further comprising:
a second electrode in contact with a second dielectric layer and connected to the power source,
wherein the power source drives the second electrode with a second voltage pattern with respect to the ground electrode, and
wherein application of the second voltage pattern produces a second plasma discharge proximate the orifice and a second electric field pattern proximate the orifice.

31. The device according to claim 30, wherein the first voltage pattern and the second voltage pattern have a phase difference.

32. The device according to claim 29, wherein the first voltage pattern is a dc voltage.

33. The device according to claim 29, wherein the first voltage pattern is an ac voltage.

34. The device according to claim 20, wherein the surface is a turbine blade surface.

35. The device according to claim 20,
wherein an exit plane of the orifice comprises a contoured edge protruding from the surface, and
wherein the contoured edge protruding from the surface has a continuously curving smooth shape.

36. The device according to claim 35, wherein the contoured edge comprises a bumper.

37. The device according to claim 20, wherein an exit plane of the orifice comprises a compound slope region recessed from the surface.

38. The device according to claim 20, wherein an exit plane of the orifice comprises a rectangular slot recessed from the surface.

* * * * *

UNITED STATES PATENT AND TRADEMARK OFFICE
CERTIFICATE OF CORRECTION

PATENT NO. : 9,200,522 B2
APPLICATION NO. : 12/747112
DATED : December 1, 2015
INVENTOR(S) : Subrata Roy It is certified that error appears in the above-identified patent and that said Letters Patent is hereby corrected as shown below:

Specification

Column 1,
Line 44, "fonned" should read --formed--.

Column 6,
Line 66, "velocity of the" should read --velocity $u_j$ of the--.

Column 11,
Line 66, "(35,000/s)" should read --(~35,000/s)--.

Column 13,
Line 32, "$T_{is}$" should read --$\eta_s$--.

Column 15,
Line 26, "bumper" should read --bumper.--.

Signed and Sealed this
Thirty-first Day of May, 2016

Michelle K. Lee
*Director of the United States Patent and Trademark Office*